(12) United States Patent
Maeda et al.

(10) Patent No.: US 12,725,223 B2
(45) Date of Patent: Sep. 1, 2026

(54) VISION SYSTEM FOR MICROASSEMBLER

(71) Applicant: Xerox Corporation, Norwalk, CT (US)

(72) Inventors: Patrick Yasuo Maeda, San Jose, CA (US); Jeng Ping Lu, Freemont, CA (US)

(73) Assignee: Ganesse Valley Innovations, LLC, Santa Clara, CA (US)

( * ) Notice: Subject to any disclaimer, the term of this patent is extended or adjusted under 35 U.S.C. 154(b) by 293 days.

(21) Appl. No.: 18/529,338

(22) Filed: Dec. 5, 2023

(65) Prior Publication Data

US 2025/0182243 A1 Jun. 5, 2025

(51) Int. Cl.
*G06T 3/4053* (2024.01)
*G06T 3/4038* (2024.01)
*G06T 7/00* (2017.01)

(52) U.S. Cl.
CPC .......... *G06T 3/4053* (2013.01); *G06T 3/4038* (2013.01); *G06T 7/0004* (2013.01); *G06T 2207/20221* (2013.01); *G06T 2207/30108* (2013.01)

(58) Field of Classification Search
CPC ... G06T 3/4053; G06T 3/4038; G06T 7/0004; G06T 2207/20221; G06T 2207/30108
See application file for complete search history.

(56) References Cited

U.S. PATENT DOCUMENTS 6,003,223 A * 12/1999 Hagen .................. G03F 9/7046
9,444,015 B2 * 9/2016 Bower .................... G09G 3/32
11,113,803 B2 * 9/2021 Saphier ................ G01N 21/956
11,148,941 B2 10/2021 Plochowietz et al.
11,203,525 B2 12/2021 Plochowietz et al.
(Continued)

FOREIGN PATENT DOCUMENTS

KR 20230127659 A * 9/2023 ............... G06T 7/70

OTHER PUBLICATIONS

Thiele et al.: "3D-printed eagle eye: Compound microlens system for foveated imaging", Researchgate, submitted Feb. 2017, [retrieved on Dec. 9, 2025]. Retrieved from the internet <https://www.researchgate.net/publication/313784716_3D-printed_eagle_eye_Compound_microlens_system_for_foveated_imaging> (Year: 2017).*
(Continued)

*Primary Examiner* — Edward Park
*Assistant Examiner* — Alexander Joseph Vaughn
(74) *Attorney, Agent, or Firm* — Fleit Intellectual Props; Jose Gutman

(57) ABSTRACT

A machine vision system and method uses high resolution telecentric, or non-telecentric, machine vision macro lenses with high pixel count large format sensors (e.g., equivalent to at least 20 to 65 mega-pixels) at magnifications that increase the native resolution of the machine vision system, while allowing the overall field-of-view (FOV) of the vision system to be large enough relative to the optics and cameras to enable side-by-side, feathered or staggered stitching of images from individual optical camera modules, which can produce an overall system working FOV image greater than or equal to 12 inches in width. The effective resolution of the machine vision system can be further improved through the use of microlens arrays, gray scale imaging, super-resolution imaging, and pixel shifting.

20 Claims, 24 Drawing Sheets

(56) References Cited

U.S. PATENT DOCUMENTS 11,242,244 B2 2/2022 Plochowietz et al.

OTHER PUBLICATIONS

Kasaya et al.: “Image-based autonomous micromanipulation system for arrangement of spheres . . . ”, AIP Publishing, submitted Jun. 1, 2004, [retrieved on Dec. 9, 2025]. Retrieved from the internet <https://pubs.aip.org/aip/rsi/article/75/6/2033/452652/Image-based-autonomous-micro (Year: 2004).*

Cappelleri et al.: “Caging micromanipulation for automated microassembly”, IEEE, submitted Aug. 18, 2011 , [retrieved on Dec. 9, 2025]. Retrieved from the internet <https://ieeexplore.ieee.org/document/5980190> (Year: 2011).*

Boominathan, et al., “Recent advances in lensless imaging”, Optica, vol. 9, Issue 1, pp. 1-16, 2022, https://doi.org/10.1364/OPTICA.431361.

Amann, S., Witzleben, M.v. & Breuer, S. 3D-printable portable open-source platform for low-cost lens-less holographic cellular imaging. Sci Rep 9, 11260 (2019). https://doi.org/10.1038/s41598-019-47689-1.

Moritex MTL Series, https://multipix.com/product/moritex-mtl-series-2/, Captured Nov. 14, 2023.

Beam shiftying Overview, https://www.optotune.com/beam-shifting, Captured Nov. 14, 2023.

4K DLP projectors Is it real 4K? (XPR technology explanation), https://projectorjunkies.com/4k-dlp-projectors-is-it-real-4k-xpr-technology-explanation/, Captured Nov. 13, 2023.

* cited by examiner 1522
1518
1524
1504
1512
1516
1520
1514

1506
1502
1508

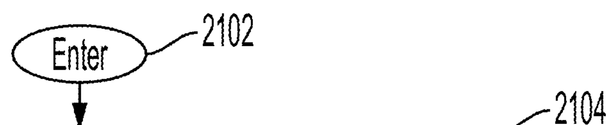

Arrange a plurality of individual optical image capture modules (IM) of a machine vision system over a working optical inspection region on a planar working surface supporting at least one micro-object; each IM including a receiving optical train optically coupled to a camera device, the optical train coupling light signals to the camera device from an IM field-of-view which is associated with an IM inspection region in the working optical inspection region on the planar working surface; predefine a plurality of IM inspection regions that cover the entire working optical inspection region on the planar working surface

2106

Capturing, by each IM in the plurality, an individual modular image (IMI) associated with an IM inspection region, each IMI having an IMI resolution

2108

Adjusting at least one IMI resolution of a respective at least one IMI to match an IMI Inspection resolution that allows the machine vision system to view and identify in the respective IMI at least one micro-object located in the associated IM inspection region on the planar working surface

2110

While there remains at least one predefined IM inspection region from which to capture an IMI for the machine vision system to completely view the entire working optical inspection region on the planar working surface, move at least one of the plurality of IM of the machine vision system over the at least one remaining predefined IM inspection region; capture an IMI associated with the at least one remaining predefined IM inspection region; and optionally adjust the IMI resolution of the captured IMI associated with the at least one remaining predefined IM inspection region

2112

Perform an image stitching operation that stitches together adjacent IMI associated with respective adjacent IM inspection regions to form a machine vision system field-of-view image associated with the entire working optical inspection region on the planar working surface Exit

VISION SYSTEM FOR MICROASSEMBLER

CROSS-REFERENCE TO RELATED APPLICATIONS

This application is related to the following two patent applications filed on even date herewith, 1) US patent application Ser. No. 18/529,416 entitled "LENSLESS NEAR-CONTACT IMAGING SYSTEM FOR MICROASSEMBLY", now U.S. Pat. No. 12,477,237, issued on Nov. 18, 2025; and 2) U.S. patent application Ser. No. 18/529,372 entitled "HETEROGENEOUS CHIPLET ID USING PHOTOLUMINESCENCE IN MICROASSEMBLER SYSTEM", now U.S. Pat. No. 12,498,329, issued on Dec. 16, 2025. These two patent applications, including the entirety of their written description and drawings, are collectively hereby incorporated by reference into the present patent application.

TECHNICAL FIELD

The present disclosure generally relates to machine vision systems, devices, and methods, and more specifically to a machine vision system for use with a microassembler system for inspection of the assembly of micro-objects and/or micro-scale devices on a planar working surface.

BACKGROUND

Current machine vision systems either have high optical resolution over a small field of view or have a large field of view with low optical resolution. Regrettably, there has been no one machine vision system that can provide high resolution over a large field of view to efficiently inspect micro-objects and/or microscale devices like micro-LEDs over a large planar surface area.

As microassembler backplanes continue to increase in size (e.g., for a large display screen of a HD, Ultra HD, 4K, or 8K, display monitor with continuously increasing pixel count), a microassembler system can be required to perform a micro-assembly process over the increasing size of the microassembler backplane. A machine vision system, which provides feedback to guide the microassembler system in a micro-assembly process, is required to have high optical resolution to support micro-assembly of an increasingly large number of micro-objects and/or micro-scale devices closely spaced together. However, a high-resolution image capture using a small field of view over small increments of an increasingly large overall working area can significantly increase the overall amount of time required for a micro-assembly process. This can detrimentally impact a manufacturing process reducing its commercial viability.

BRIEF SUMMARY

According to various embodiments of the invention, a machine vision system and a method therefor captures images with a high-resolution pixel count equivalent to at least 20 to 65 megapixels, over a large field of view (FOV), e.g., an overall machine vision system FOV greater than or equal to 12 inches in width.

According to various embodiments, a machine vision system uses high resolution telecentric, or non-telecentric, machine vision macro lenses with high pixel count large format sensors, e.g., equivalent to 20 to 65 megapixels, at magnifications that increase the native resolution of the machine vision system while allowing the FOV of the machine vision system to be large enough relative to the optics and cameras to enable side-by-side, feathered or staggered stitching of captured images from individual optical modules to produce an overall machine vision system FOV greater than or equal to 12 inches in width.

Certain examples of the disclosure increase the space-bandwidth product beyond conventional imaging systems by using high-resolution cameras with large format high pixel-count sensors with magnifications that allow the combination of individual imaging systems with individual system field-of-views to create a machine vision system with a large overall vision system field-of-view and that uses various optical and imaging methods and techniques to increase the effective resolution over the large overall vision system field-of-view.

According to certain embodiments, the effective resolution of the overall FOV of the machine vision system can be further improved by using at least one image processing tool selected from the following list: microlens arrays, grayscale imaging, super-resolution imaging, and pixel shifting.

Certain embodiments, for example, include cameras using a high-resolution machine vision macro lens comprising a magnification of 0.25× to 1.75× macro lens optical systems with up to 2" format 20 MP to 65 MP image sensors with 2-micron to 4-micron pixel pitch value that create images that can be stitched in side-by-side, feathered or staggered geometries, to form the overall field-of-view of the machine vision system. In some embodiments, a receiving optical train can include a telecentric high-resolution machine vision macro lens comprising a magnification of 0.25× to 1.75× macro lens.

Various embodiments can use one or more microlens arrays to create a foveal region to increase the native resolution in the neighborhood of desired micro-object and/or microscale device position datums or locations.

In some embodiments, a plurality of individual camera modules with individual camera field-of-views (FOVs), capture a respective plurality of images that can be staggered and stitched together in geometry, e.g., by using a step-and-repeat image assembly process that can achieve an efficiency of $n/(2(p+n))$, where n is the number of FOV rows in the overall stitched image and p is the pitch of the staggered geometry.

According to some embodiments, the machine vision system can use grayscale image processing in low-resolution images captured by the individual camera modules to detect the centroid, position, and rotation, of micro-objects and/or microscale devices such as micro-LED chips, and the machine vision system can use grayscale imaging to perform rough alignment of the micro-objects and microscale devices on a planar working surface, such as for a micro-assembly process.

According to some embodiments, the machine vision system can use super-resolution image processing in low-resolution images captured by the individual camera modules, such as for a micro-assembly process.

In certain embodiments, according to one example, the machine vision system can use super-resolution algorithms on sets of sub-pixel-shifted low-resolution images to produce a high-resolution image, such as for a micro-assembly process.

Features and advantages of the above-described machine vision system and method suitable for use with a microassembler system will become readily apparent from the following description and accompanying drawings.

All references, publications, patents, and patent applications, cited herein and/or cited in any accompanying Information Disclosure Statement (IDS), are hereby incorporated herein by reference in their entirety for all purposes.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to illustrate various examples and to explain various principles and advantages all in accordance with the present disclosure, in which:

FIG. 21 is an operational flow diagram illustrating an example method of operation of a machine vision system such as shown in FIG. 20;

FIGS. 24A and 24B illustrate alternative views of the FOV optical module array shown in FIG. 14, in which FIG. 24A shows a side view and FIG. 24B shows a perspective view.

DETAILED DESCRIPTION

Figure 1:
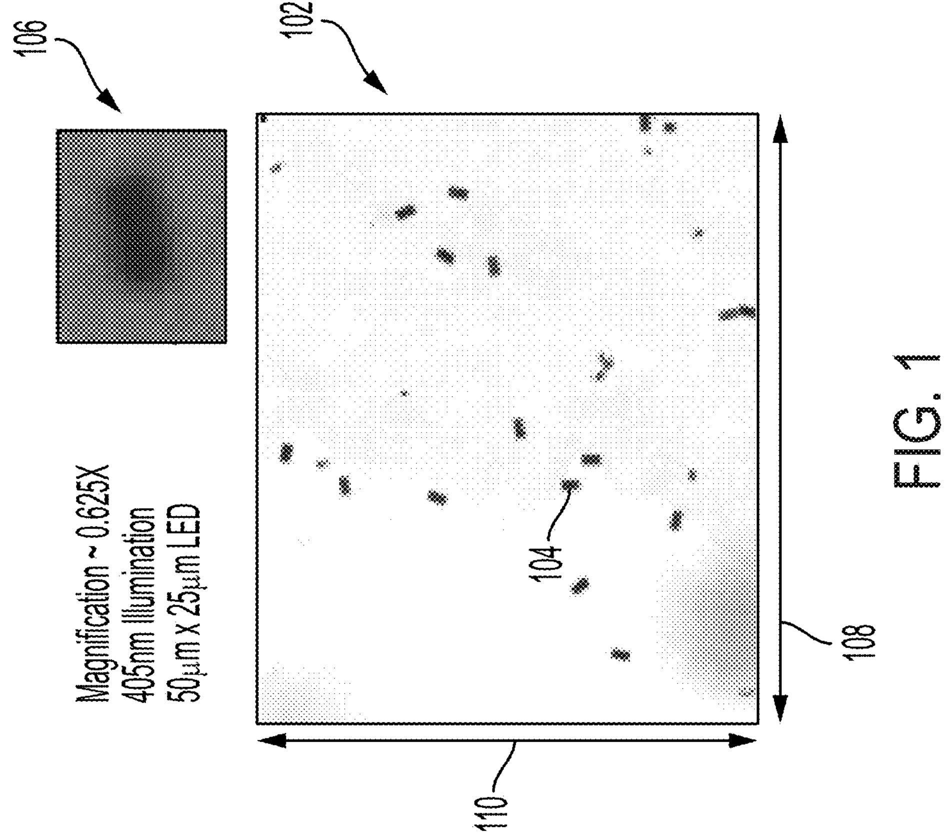
FIG. 1 is an illustration of an example machine vision system view of a working optical inspection region on a planar working surface viewed from above and showing a plurality of micro-objects and/or micro-LEDs located directly on the planar working surface, according to various examples of the present disclosure.

As required, detailed embodiments are disclosed herein; however, it is to be understood that the disclosed embodiments are merely examples and that the devices, systems, and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

Non-Limiting Definitions

The terms "microassembler system" or "microassembler", and the like, are intended to mean herein any configuration of equipment that is configured to process or perform any operation, e.g., a manufacturing operation, associated with assembling micro-objects and/or micro-scale devices in a working area on a generally planar working surface.

The term "micro-object" is intended to mean herein a small object or particle that may be used for various purposes in the manufacture and construction of various devices. Some assembly processes place a number of micro-objects into particular locations in a working area on a generally planar working surface.

The term "micro-scale device" is intended to mean herein a micro-object that comprises a small device sized in a critical dimension generally at a micron level; and where such small device can be used for various purposes in the manufacture and construction of various devices. Some micro-assembly processes place a number of micro-scale devices into particular locations in a working area on a generally planar working surface. A non-limiting example of a micro-scale device is a micro-LED that can be assembled with other micro-objects and micro-scale devices in various locations in a working area on a generally planar working surface, such as to manufacture a display screen.

The term "target location" is intended to mean herein a location in a working area on a generally planar working surface into which a micro-object and/or micro-scale device is intended to be placed as part of a micro-assembly process.

The term "working area" is intended to mean herein an area on a generally planar working surface in which a microassembler system manipulates and/or places a micro-object and/or a micro-scale device as part of a micro-assembly process.

The terms "manipulate", "manipulating", and the like, are intended to mean herein a microassembler in a micro-assembly process imparting movement to a micro-object and/or micro-scale device in a working area on a generally planar working surface; such movement can include, but is not limited to, adjusting the position of, rotation of, alignment of, performing right-side-up verification of, at least one micro-object and/or micro-scale device in the working area.

The term "micro-object location sensor" is intended to mean herein any sensor device or apparatus that is able to detect locations of micro-objects and/or micro-scale devices within its range. In general, a micro-object location sensor is able to use any technique to determine locations of micro-objects.

The terms "image from a micro-object location sensor", "captured image", "image", and the like, are intended to mean herein in the context of a machine vision system any dataset that includes information indicating physical locations of micro-objects and/or micro-scale devices without regard to the format of that information or how the location information is indicated. In general, an image that contains images of micro-objects on the generally planar working surface includes any dataset that includes information indicating locations of micro-objects on the generally planar working surface, regardless of methods and technologies used to obtain that location data.

The term "module field of view region" is intended to mean herein a region on a planar working surface, where such region is associated with a field of view of an optical module.

The term "working field of view region" is intended to mean herein an overall region on a planar working surface, comprising a plurality of optical module field of view regions. It generally represents a machine vision system overall working region on a planar working surface.

Introduction

A machine vision system, according to various embodiments, provides image data feedback suitable for a microassembler system to be capable of manipulating, positioning, orienting, and assembling, micro-objects and/or micro-scale devices over a large working area on a generally planar working surface. A large area (e.g., a large working area) for a machine vision system can be at least twelve (12) inches wide, as will be discussed in more detail below. The machine vision system can provide image-based feedback with a high resolution and a large overall machine vision system field-of-view (FOV) that can provide the imaging feedback to the microassembler system to manipulate, position, orient, and assemble, the micro-scale devices over a large working area.

Micro-assemblers in some examples are a type of manufacturing equipment that operates to assemble products containing micro-objects by placing one or more micro-objects into defined locations on a surface. Micro-objects in some examples are small objects or particles that may be used for various purposes in the manufacture and construction of various devices. In some examples, a micro-object may be an object that ranges in size from 1 micrometer to 500 micrometers, although other sizes are possible. The micro-objects are typically made up of dielectric materials that are neutral but polarizable. As a result, they experience electrostatic forces and undergo directed movement when they are subjected to a nonuniform electric field due to the interaction of the particle's dipole and spatial gradient of the electric field. This phenomenon is called dielectrophoresis. The micro-objects in other examples can also be charge encoded micro-objects or magnetic field pattern encoded micro-objects. For example, a micro-object may have a positive charge, may be charged with a specific pattern, may be encoded with a particular charge or magnetic field pattern, or combinations of these. The movement of charged micro-objects or particles under the influence of an electric field is called electrophoresis.

In the following description, a device that has a surface adapted for use in a micro-assembly process performed by a microassembler coupled to a machine vision system incorporating the herein described systems and methods can be referred to as a microassembler backplane. In some of the below described examples, micro-objects are manipulated on a surface of a microassembler backplane upon which they are to be placed by electrical potentials induced by conductive elements (e.g., electrodes) that are placed on or in proximity to the microassembler backplane. In examples, these conductive elements are coupled to an optical switch with a storage capacitor arranged in a manner similar to pixels across a display, i.e., in an array across the generally planar working surface onto which micro-objects are to be placed. In various examples, such arrangements are able to be uniform or, irregular, or a combination of both.

These conductive elements are able to be selectively activated by any suitable technique that creates an electric field on the surface of a micro-assembler backplane on which the micro-objects are placed. In an example, an electrical potential is able to be placed on an electrode in the micro-assembler backplane by activating a light activated switch, such as a phototransistor, that charges a storage capacitor whose output terminal provides a voltage source to that electrode. In an example, a microassembler backplane is able to have a configurable, time varying, electrical potential field applied across its array of electrodes by controlling a corresponding array of phototransistors and storage capacitors that connect each electrode to a voltage source. In an example, this array of phototransistors is able to be arranged on or in proximity to the microassembler backplane, such as on a surface that is opposite the surface onto which micro-objects are placed. Selective activation of electrodes in such an example is able to be achieved by illuminating the array of phototransistors with a variable light pattern that varies with time to illuminate selected phototransistors to cause a corresponding time varying electric field to be generated on the surface of the micro-assembler backplane on which micro-objects are placed. This configurable and time varying electrical potential allows micro-objects to be moved and placed along the surface of the micro-assembler backplane by selectively projecting variable light patterns that are optical image control patterns.

A selected set of phototransistors, when exposed to light, are able to be used to switch one or more of a positive voltage, a negative voltage, and an AC voltage, to charge selected electrodes on or in close proximity to the surface of the microassembler backplane. In an example, each of those electrodes contain a conductive element that is able to generate one or more of dielectrophoretic (DEP) and electrophoretic (EP) forces on the surface onto which micro-objects are to be placed. The DEP and EP forces may be used to manipulate single micro-objects or groups of micro-objects that may comprise functionally identical or distinct micro-objects.

Using a variable light pattern containing a control pattern to illuminate selected phototransistors allows the micro-assembler to precisely and quickly manipulate micro-objects and place them or orient them in specific locations, shapes, or patterns. Control patterns which are able to be formed by an optical image that is projected onto the phototransistor array may be used to control the phototransistors or other devices that are able to control or generate an electric field (e.g., electrodes, transistors, phototransistors, capacitors, etc.). Control patterns contained in the variable light pattern in some examples indicate a voltage pattern that is to be formed across at least a portion of the microassembler backplane surface. Utilizing a light emitting device to generate optical image control patterns or voltage patterns allows a computing device to automatically form or place micro-objects into shapes or patterns. A camera and/or other micro-object location sensor is able to be used to determine the position and orientation of micro-objects on a microassembler backplane surface such as by processing an image captured of that surface by a camera. In further examples, other devices may be used to detect the positions and orientations of micro-objects on the micro-assembler surface.

Various Examples of Machine Vision Systems And Methods

Referring to FIG. 1, an example machine vision system is viewing a working optical inspection region 102 (e.g., a working area) on a planar working surface viewed from above and showing a plurality of micro-objects and/or micro-LEDs 104 located directly on the planar working surface, according to various examples of the present disclosure. The working optical inspection region 102, which may also be referred to as a vision system working area, and the like, includes a plurality of micro-objects and/or micro-LEDs 104 located at various locations distributed over the working area 102 as shown. Working area 102 has a defined width 108 and a defined height 110 as shown. In this example, the micro-LED device 104 can be a 50 μm×25 μm image element 106 shown under 405 nm illumination light and at a magnification factor of approximately 0.625×.

Figure 2:
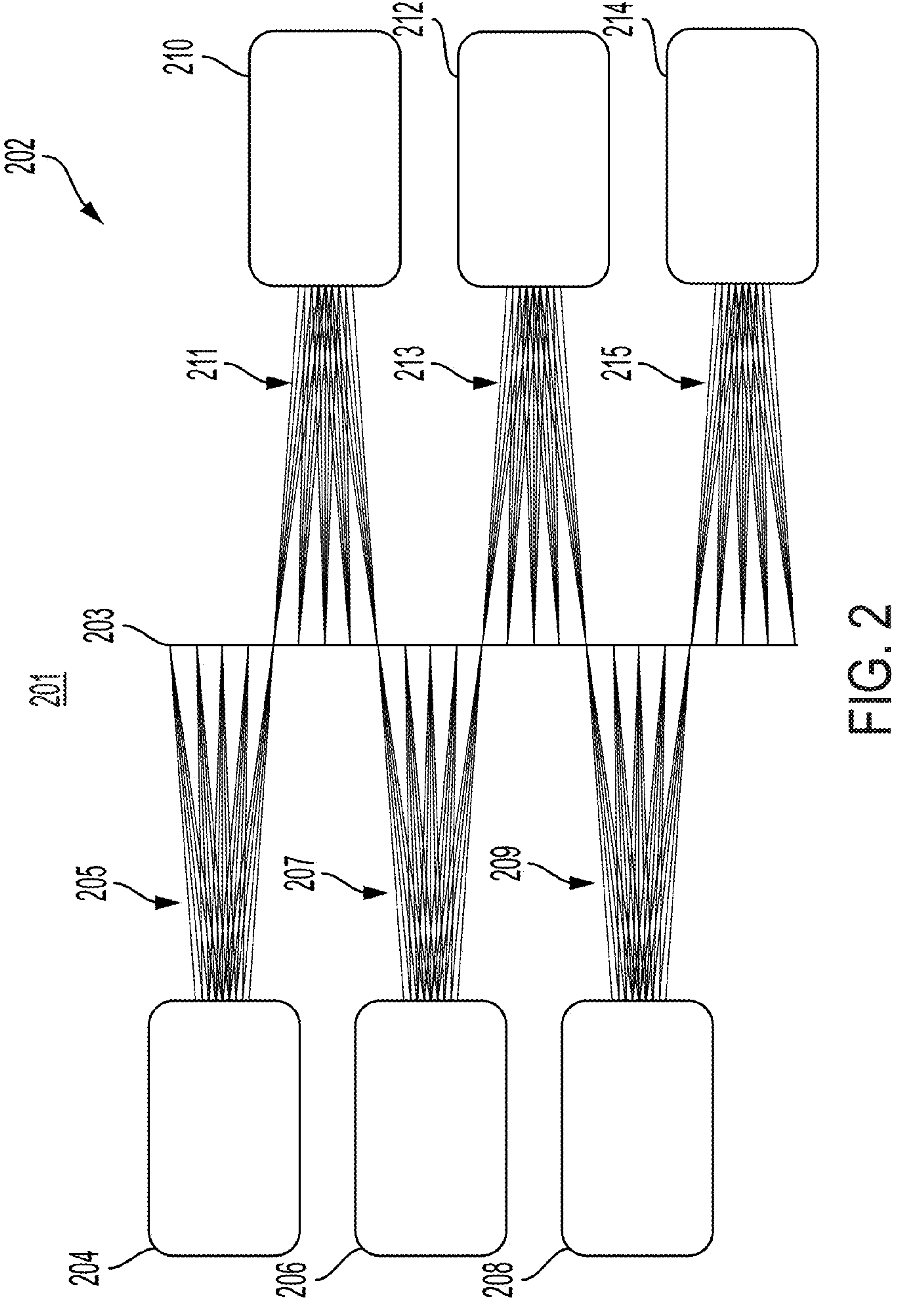
FIG. 2 is an illustration of an example array of individual optical image capture modules (also referred to as "optical modules") of the machine vision system of FIG. 1, where the optical modules are arranged side-by-side in a feathered field-of-view (FOV) optical module array above the working optical inspection region on the planar working surface.

Referring to FIG. 2, an array 202 of six individual optical image capture modules (also referred to as "optical modules", "IM", and the like) 204, 206, 208, 210, 212, 214, of a machine vision system 201, are arranged side-by-side in a feathered field-of-view (FOV) optical module array 202 viewing from above the working optical inspection region 102 on the planar working surface. The optical modules in the feathered FOV optical module array 202 are arranged such that captured images by the individual optical modules can be stitched together in side-by-side staggered geometry where a plurality of FOV images of side-by-side optical modules touch or slightly overlap each other thereby a stitching operation can form a continuously captured image of the working region on the planar working surface from the captured plurality of FOV images.

In the example of FIG. 2, each of the plurality of optical modules 204, 206, 208, 210, 212, 214, has an associated module FOV captured image 205, 207, 209, 211, 213, 215, arranged side-by-side touching or slightly overlapping another adjacent module FOV image thereby forming a row 108 of six module FOV images that stitched together form a continuously captured image of a row 108 in the working region on the planar working surface.

It should be noted that, according to various embodiments, a stitched-together staggered geometry of captured side-by-side images might not necessarily form a continuously captured image of a row 108 in the working region on the planar working surface. That is, FOV images from adjacent side-by-side optical modules may not touch or slightly overlap each other. See FIG. 8 for a comparison to the side-by-side feathered FOV optical images discussed above. However, the FOV images from adjacent side-by-side optical modules can represent relevant areas of the working region where are located micro-objects and/or microscale devices like micro-LEDs. These views and corresponding FOV images in a stitched-together staggered geometry are nonetheless useful to a microassembler system.

Lastly as shown in FIG. 2, each optical module 204, 206, 208, 210, 212, 214, includes an optical train 203 which optically couples light signals in a field-of-view image from the planar working surface in the working region to one or more image sensors in a camera device in each optical module. The optical train 203, in this example, includes one or more light reflective surfaces (e.g., one or more mirrors) that guide light signals from the planar working surface in the working region to the one or more image sensors in a respective camera device.

Figure 3:
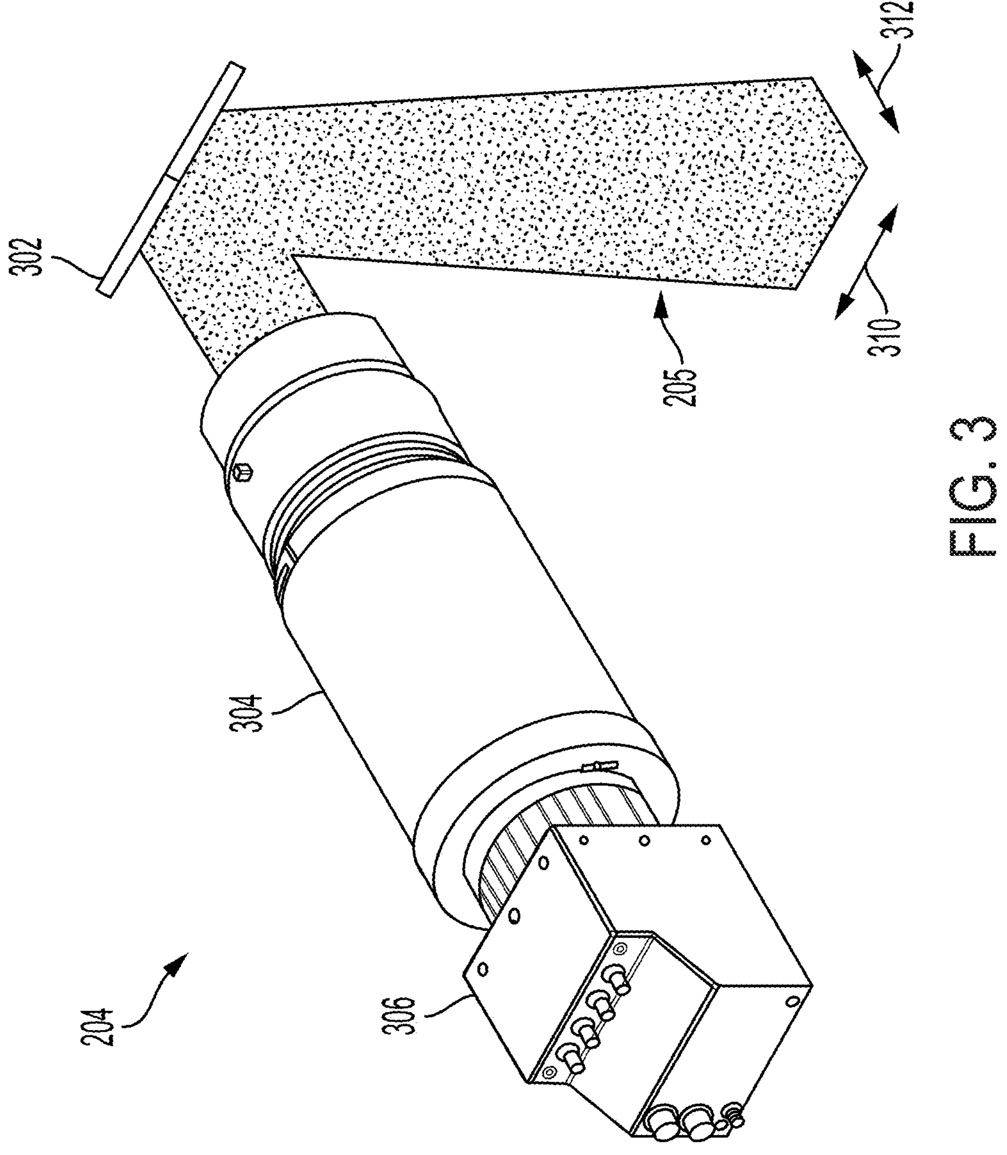
FIG. 3 is a perspective view of one individual optical module illustrated in FIG. 2.

FIG. 3 illustrates a more detailed view of one example individual optical module 204 shown in FIG. 2. Optical module 204 includes an optical train coupling light signals 205 from a module FOV region on a planar surface, defined by width 310 and height 312 on the planar working surface, to one or more optical sensors in a camera device 306, via one or more mirrors 302 and one or more lenses 304.

Figure 4:
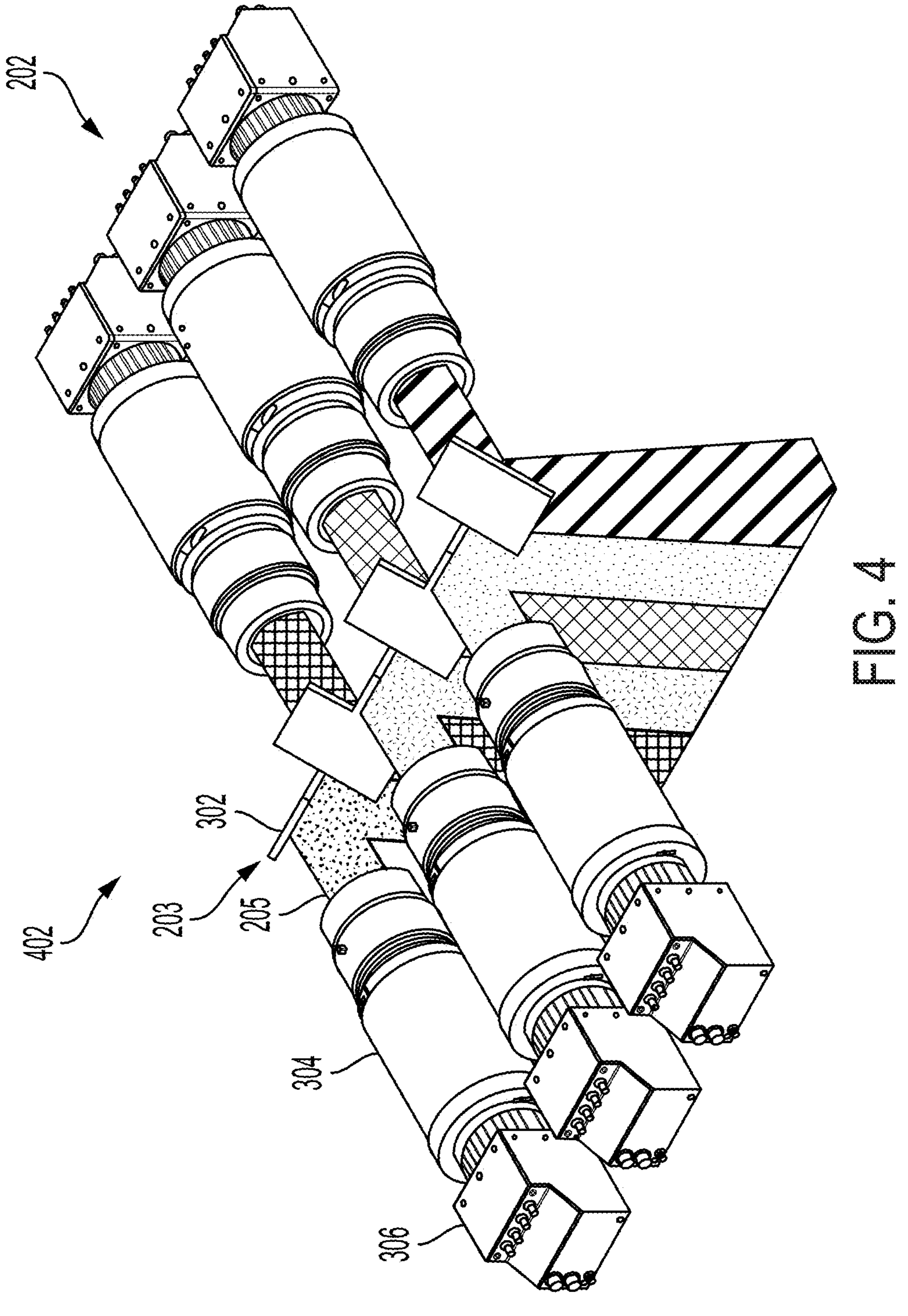
FIG. 4 is a perspective view of the example feathered FOV optical module array illustrated in FIG. 2.

FIG. 4 is a perspective view 402 of the example feathered FOV optical module array 202 in a machine vision system shown in FIG. 2. The optical module array 202 includes 6 optical modules 204, 206, 208, 210, 212, 214. An optical train 203 for each optical module 204 includes one or more mirrors 302 that optically couple light signals 205 in a field-of-view image from the planar working surface in the working region to one or more image sensors in a camera device 306, as discussed above. The optical modules 204, 206, 208, 210, 212, 214, and the optical train 203 for each respective optical module, are arranged side-by-side thereby forming a row 108 of six FOV images that stitched together form a continuously captured image of a row 108 in the working region on the planar working surface.

Figure 5:
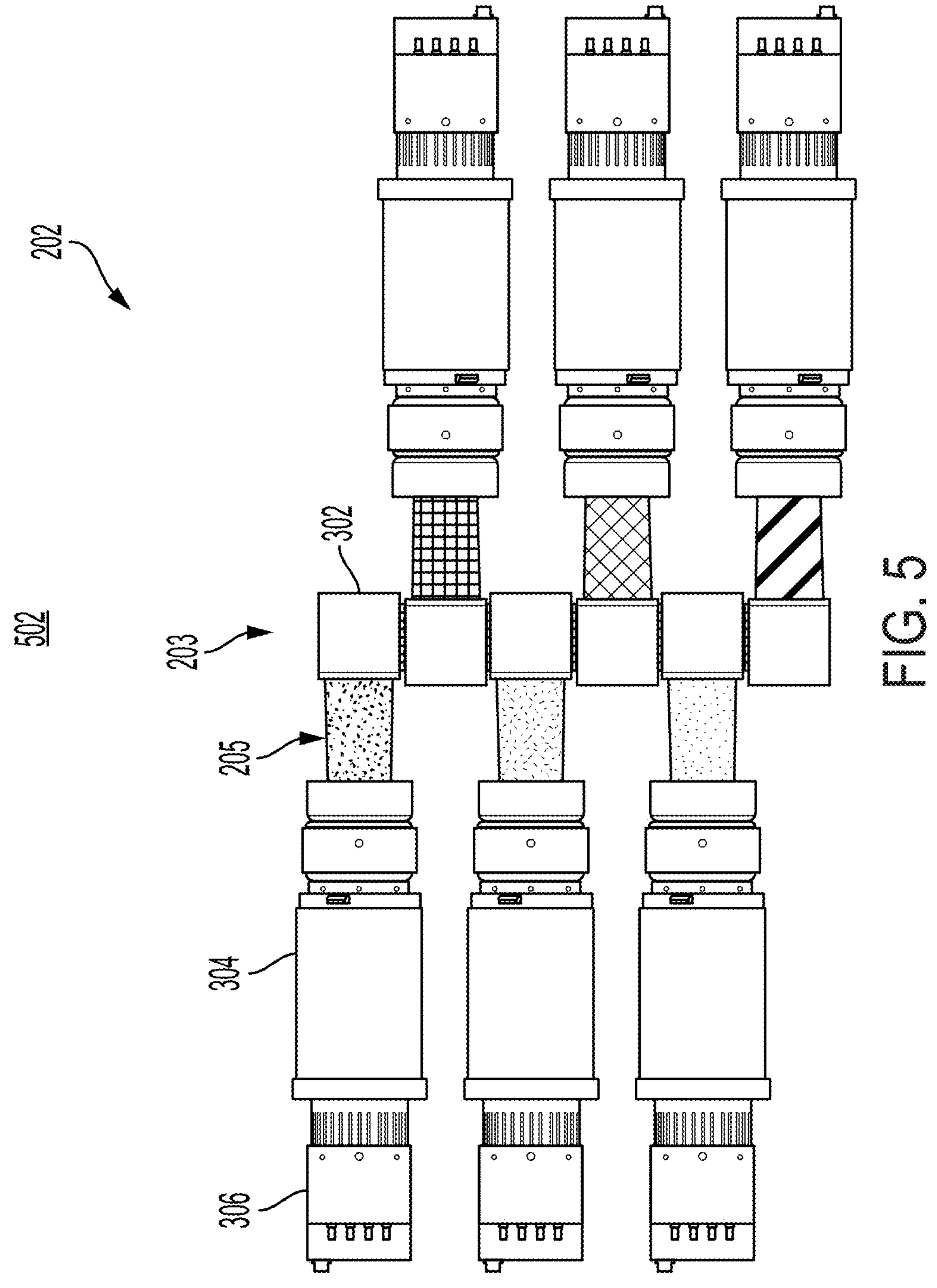
FIG. 5 is a top planar view of the example feathered FOV optical module array shown in FIG. 4.

FIG. 5 is a top planar view 502 of the example feathered FOV optical module array 202 shown in FIG. 4.

Figure 6:
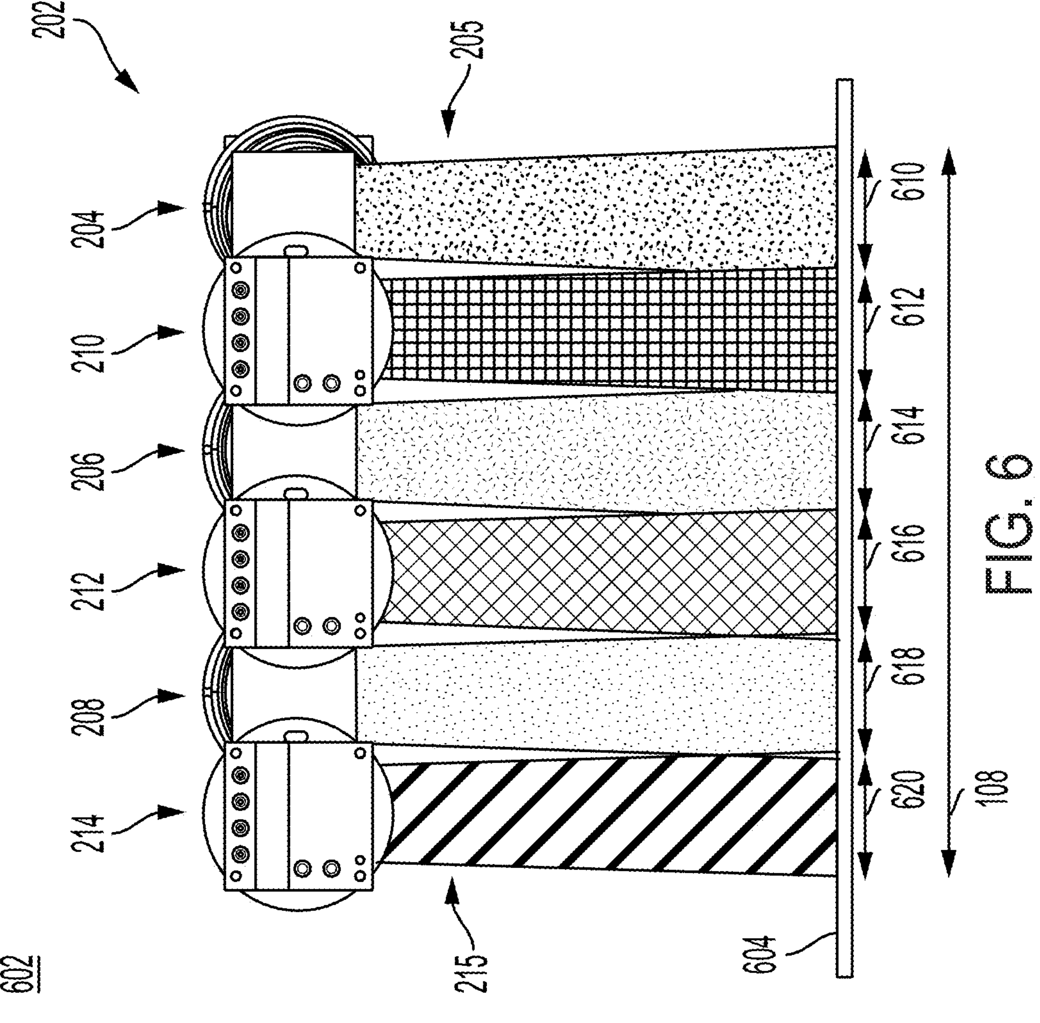
FIG. 6 is a rear planar view of the example feathered FOV optical module array shown in FIG. 4.

FIG. 6 is a rear planar view 602 of the example feathered FOV optical module array 202 shown in FIG. 4. The six optical modules 204, 206, 208, 210, 212, 214, are arranged side-by-side to capture from a planar working surface 604 six feathered FOV images 610, 612, 614, 616, 618, 620, arranged side-by-side touching or slightly overlapping adjacent FOV images in a row 108 along a width of the working region. The six FOV images 610, 612, 614, 616, 618, 620, when stitched together form a continuously captured image of the row 108 on the planar working surface 604.

Figure 7:
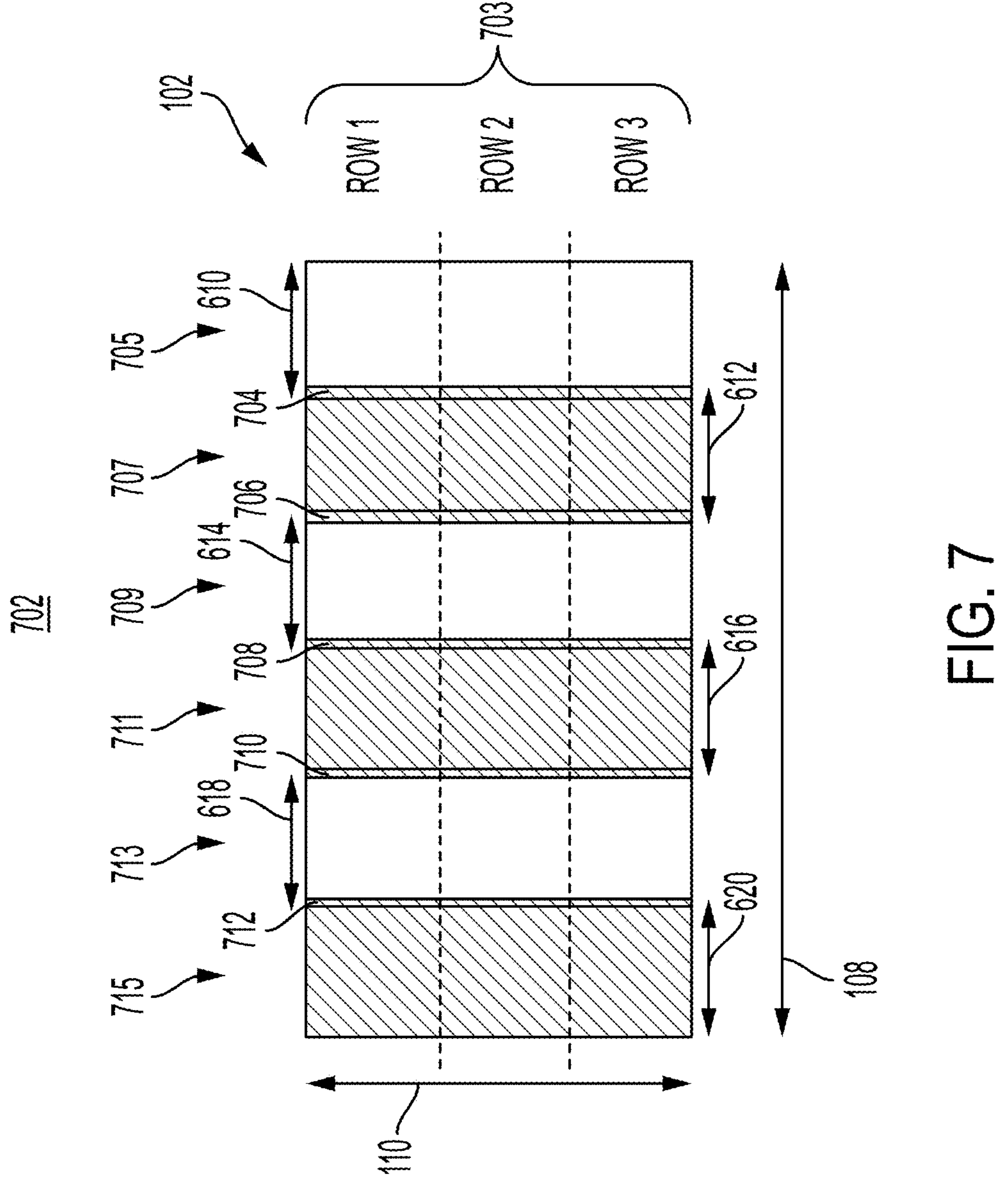
FIG. 7 is a top view of an example plurality of module FOV regions arranged in three rows by six columns on a planar working surface, from which to capture images by six individual optical modules arranged in a FOV optical module array such as shown in FIG. 4.

FIG. 7 is a top view 702 of example six feathered FOV images 610, 612, 614, 616, 618, 620, arranged side-by-side touching or slightly overlapping adjacent FOV images in row 108 along a width of the working region. The six feathered FOV images 610, 612, 614, 616, 618, 620, are captured three times by the set of six optical modules 204, 206, 208, 210, 212, 214, thereby forming stitched together three rows 703 along the height 110 of the working region 102, by six columns 705, 707, 709, 711, 713, 715, of feathered stitched images along the width 108 of the planar working surface 604 in the working optical inspection region 102. As can be seen in FIG. 7, the adjacent FOV images 705, 707, 709, 711, 713, 715, have slight overlap areas 704, 706, 708, 710, 712, as shown.

Figure 8:
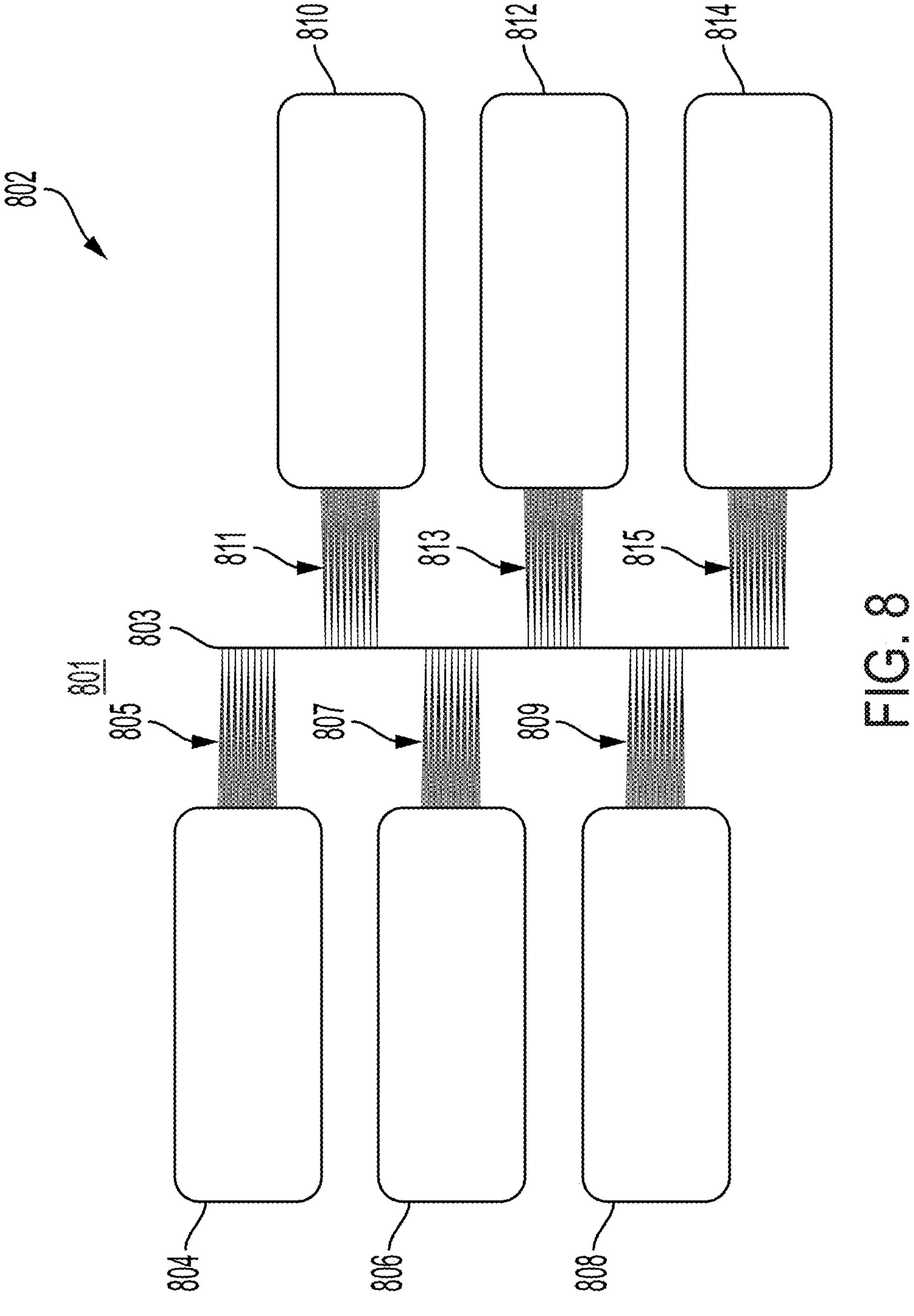
FIG. 8 is a top view of an example array of individual optical image capture modules of a machine vision system, where individual optical modules are arranged side-by-side in a staggered stitching module array above the working optical inspection region on the planar working surface.

FIG. 8 is a top view of an example array 802 of individual optical image capture modules 804, 806, 808, 810, 812, 814, of an example machine vision system 801, where individual optical modules are arranged side-by-side in a staggered stitching module array above a working optical inspection region on a planar working surface. An optical train 803 optically couples light signals in a field-of-view image from the planar working surface in the working region to one or more image sensors in a camera device in each optical module. The optical train 803, according to this example, includes one or more light reflective surfaces (e.g., one or more mirrors) that guide light signals from the planar working surface in the working region to the one or more image sensors in a respective camera device. According to this example, a stitched-together staggered geometry of captured side-by-side images does not necessarily form a continuously captured image of a row in the working region on the planar working surface. That is, FOV images 805, 807, 809, 811, 813, 815, from adjacent side-by-side optical modules may not touch or slightly overlap each other. However, the FOV images from adjacent side-by-side optical modules can represent relevant areas of the working region where are located micro-objects and/or microscale devices like micro-LEDs. These views and corresponding FOV images in a stitched-together staggered geometry are nonetheless useful to a microassembler system.

Figure 9:
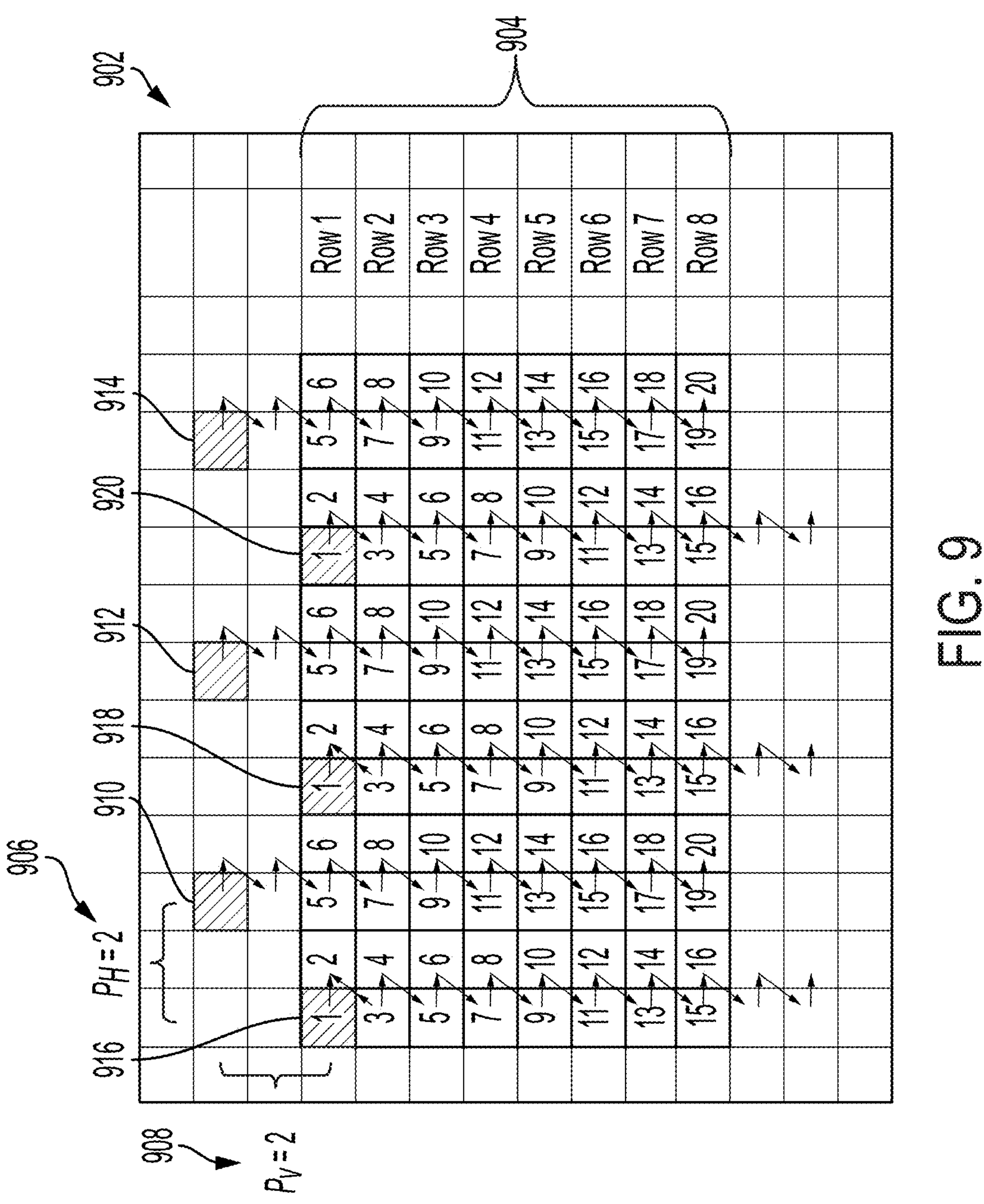
FIG. 9 is a top view of an example plurality of module FOV regions on a planar working surface, from which to capture images by six individual optical modules in a staggered FOV stitching geometry using a step-and-repeat assembly process in which a horizontal pitch is two and a vertical pitch is two.

FIG. 9 is a top view of a first example plurality of module FOV regions in a working area on a planar working surface 902, arranged in 8 rows 904 and twelve columns from which to capture images by six individual optical modules 910, 912, 914, 916, 918, 920. Optical modules are arranged in a staggered FOV stitching geometry using a step-and-repeat assembly process in which a horizontal pitch 906 is two and a vertical pitch 908 is two.

As shown in FIG. 9, three optical modules 916, 918, 920, start in row number 1, and three optical modules 910, 912, 914, start in a row that is two vertical module FOV positions above row number 1 and outside of the working area. The three optical modules 916, 918, 920, in row number 1, immediately capture a module FOV image at step position number 1, as shown. Then, these same modules move to step position number 2 in row number 1 and capture a module FOV image at step position number 2. The six individual optical modules 910, 912, 914, 916, 918, 920, all move in one synchronized group movement following the numbered step-and-repeat sequence 1 to 16, to capture images from the respective module FOV regions in the working area on the planar working surface 902. After the optical modules 916, 918, 920, step from row number 1, to row number 2, and to row number 3, the other three optical modules 910, 912, 914, that were initially outside of the working area, reach row number 1 at step position number 5. These optical modules 910, 912, 914, start capturing module FOV images at step position 5, then at step position 6, and then at step position 7, continuing in steps up to step position number 20.

A machine vision system arranges the captured module FOV images from the six optical modules moving together as one group in a side-by-side module FOV image assembly process. The system prepares the captured module FOV images for an adjacent image stitching operation, possibly performing image processing on individual captured module FOV images. For example, the machine vision system might adjust image resolution for a captured module FOV image to meet certain image resolution requirements, such as to enable a microassembler system to detect, identify, and move micro-objects and/or microscale devices located on the planar working surface based on the micro-objects and/or microscale devices being detected and identified in the captured module FOV image.

Figure 22:
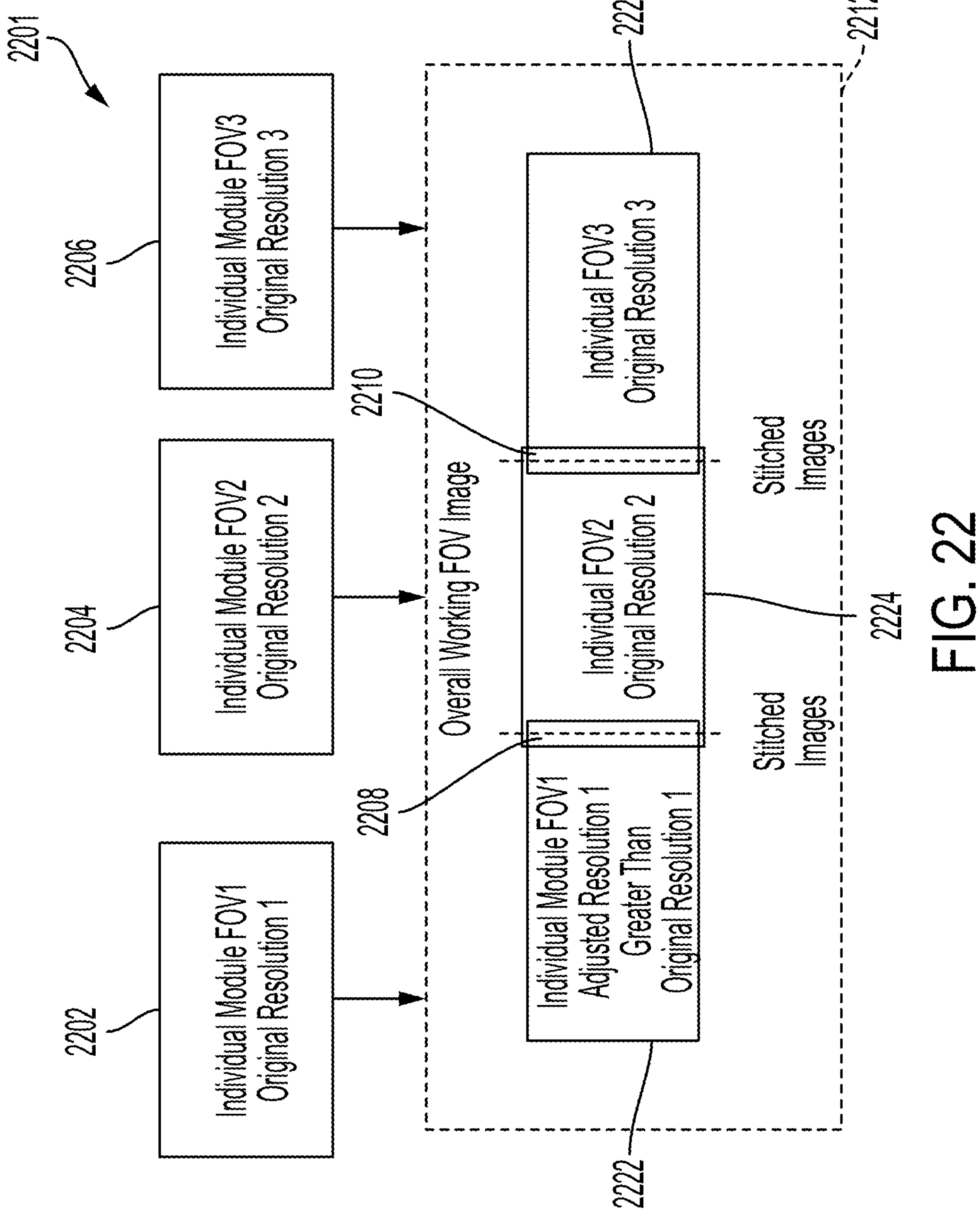
FIG. 22 is a block diagram illustrating an example of image capture, processing, and stitching operations of a machine vision system suitable for use by a microassembler system, according to an example of the present disclosure.

FIG. 22 illustrates an example of image processing on three separate module FOV images 2202, 2204, 2206, captured by a set of three individual optical modules in a machine vision system (not shown). The machine vision system analyzes the three captured module field-of-view images 2202, 2204, 2206. It determines that the first module FOV image 2202 from the first optical module has a resolution that is too low for the machine vision system to adequately identify micro-objects and/or microscale devices in the first module FOV image 2202, while the second module FOV image 2204 and the third module FOV image 2206 have original image resolutions that are adequate for the machine vision system to identify micro-objects and micro-scale devices. The machine vision system performs image processing 201 on the first module FOV image 2202 to adjust the image resolution to a higher resolution that is adequate for the machine vision system to identify the micro-objects and microscale devices. Examples of this image processing 201 will be discussed in more detail below.

The system then performs further image processing 201 by an image stitching operation in which the adjusted first module FOV image 2222, with its image resolution having been adjusted to a higher resolution, is stitched together 2208 with the second module FOV image 2224, with its original image resolution, and which is stitched together 2210 with the third module FOV image 2226, with its original image resolution. The stitching operation forms an overall working FOV image 2212 that is the combination of the three module FOV images 2222, 2224, 2226, in which the image resolution for the overall working FOV image 2212 is adequate for the machine vision system to identify micro-objects and microscale devices located in the overall working FOV image 2212. In certain embodiments, a resolution of an overall working FOV captured image can be at least equal to or greater than the resolution of any module FOV captured image from the plurality of module FOV regions on the planar working surface. Additionally, in certain embodiments a width of an overall working FOV region on the planar working surface is at least ten times larger than a width of any one module FOV region in the plurality of module FOV regions on the planar working surface.

The above-described first example step-and-repeat module FOV image capture and assembly process can be characterized by:

- a working FOV region arranged in 8 rows and 12 columns of module FOV regions, where the six individual optical modules 910, 912, 914, 916, 918, 920, capture module FOV images of their respective module FOV regions according to:
- a horizontal stagger pitch ($P_H$) of module FOV regions in the same row is two,
- a vertical stagger pitch ($P_V$) of module FOV regions in separate rows is two, and
- n is a total number of rows which in this example is eight, and
- s is the total number of steps, which in this example equals $P_H(P_V+n)=2*(2+8)=20$, and
- where the step-and-repeat assembly process achieves an efficiency of capturing module-captured images, and stitching adjacent module-captured images, based on the formula
- $n/(P_H(P_V+n))$. In this example, the efficiency for the step-and-repeat assembly process is $8/(2*(2+8))=0.4$. The efficiency metric can be specified within a tolerance of 0.1 (e.g., one tenth). If a total number of rows is increased to greater than or equal to 1000, the efficiency metric can be specified within a tolerance of 0.01 (e.g., one one-hundredth).

Figure 10:
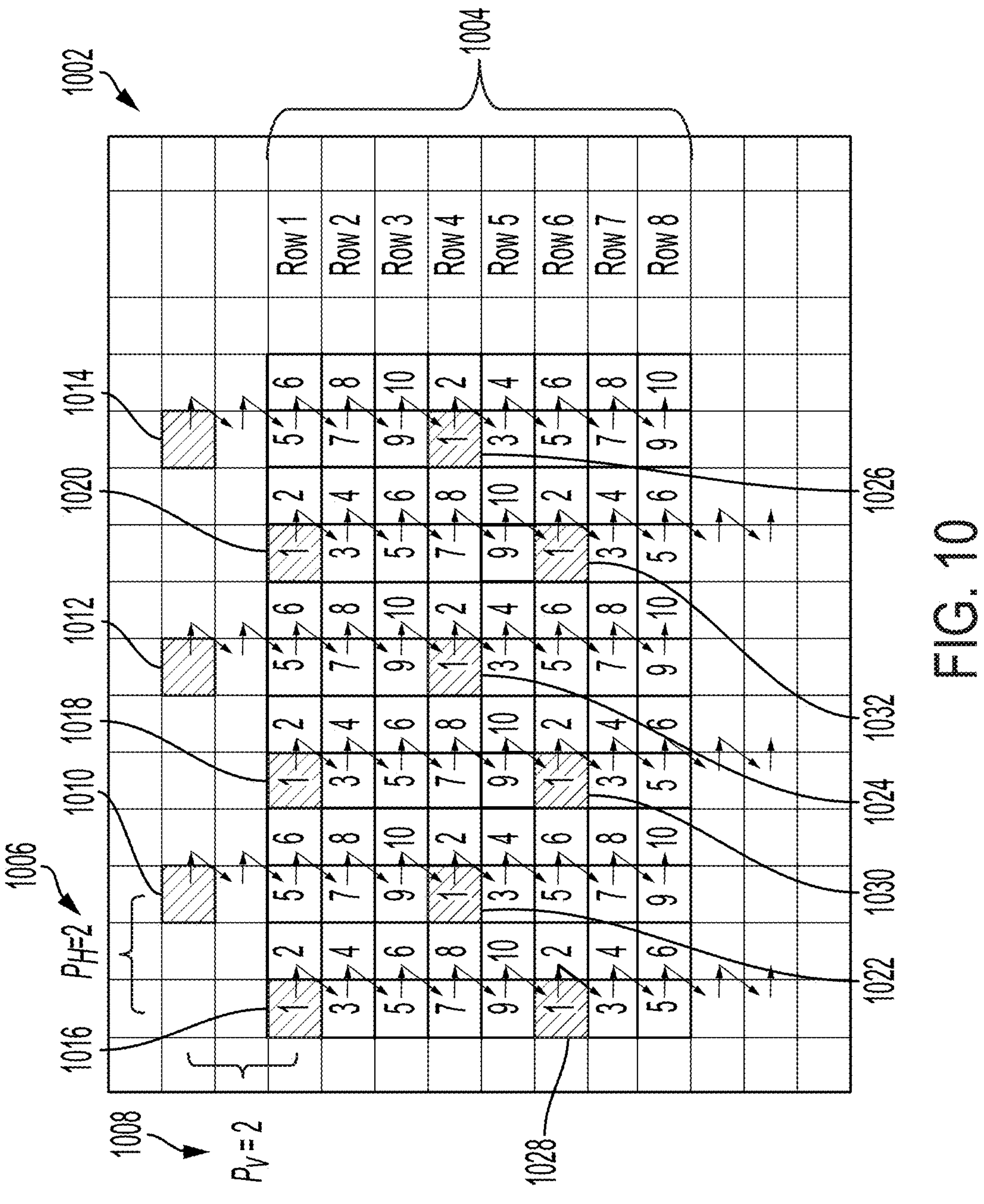
FIG. 10 is a top view of an example plurality of module FOV regions on a planar working surface, from which to capture images by twelve individual optical modules in a staggered FOV stitching geometry using a step-and-repeat assembly process in which a horizontal pitch is two and a vertical pitch is two.

Referring to FIG. 10, a second example plurality of module FOV regions in a working area on a planar working surface 1002, is shown arranged in eight rows 1004 by twelve columns from which to capture images by twelve individual optical modules 1010, 1012, 1014, 1016, 1018, 1020, 1022, 1024, 1026, 1028, 1030, 1032, in a staggered FOV stitching geometry using a step-and-repeat assembly process in which a horizontal pitch 1006 is two and a vertical pitch 1008 is two.

As shown in FIG. 10, three optical modules 1016, 1018, 1020, start in row number 1, three optical modules 1022, 1024, 1026, start in row number 4, and three optical modules 1028, 1030, 1032, start in row number 6, and three optical modules 1010, 1012, 1014, start in a row that is two vertical module FOV positions above row number 1 and outside of the working area.

The three optical modules 1016, 1018, 1020, in row number 1, the three optical modules 1022, 1024, 1026, in row number 4, and the three optical modules 1028, 1030, 1032, in row number 6, immediately capture a module FOV image at step position number 1, as shown. Then, these same modules move to step position number 2 in respective rows number 1, 4, and 6, and capture a module FOV image at step position number two. The twelve individual optical modules 1010, 1012, 1014, 1016, 1018, 1020, 1022, 1024, 1026, 1028, 1030, 1032, all move in one synchronized group movement following the numbered step-and-repeat sequence 1 to 10, to capture images from the respective module FOV regions in the working area on the planar working surface 1002.

After the optical modules 1016, 1018, 1020, step from row number 1 to row number 2, and then to row number 3, and contemporaneously the second group of three optical modules 1022, 1024, 1026, steps from row number four to row number five and then to row number 6, and the third group of three optical modules 1028, 1030, 1032, steps from row number 6 to row number 7 and then to row number 8, the group of three optical modules 1010, 1012, 1014, that were initially outside of the working area, reach row number 1 at step position number 5. These optical modules 1010, 1012, 1014, start capturing module FOV images at step position 5, and then at step position 6, and then at step position 7, continuing in steps up to step position number 10.

A machine vision system arranges the captured module FOV images from the twelve optical modules moving together as one group in a side-by-side module FOV image assembly process. The system prepares the captured module FOV images for an adjacent image stitching operation, possibly performing image processing on individual captured module FOV images. For example, the machine vision system might adjust image resolution for a captured module FOV image to meet certain image resolution requirements such as to enable a microassembler system to detect, identify, and move micro-objects and/or microscale devices located on the planar working surface based on the micro-objects and/or microscale devices being detected and identified in the captured module FOV image. See the discussion above with reference to FIG. 22 for an example of image processing to adjust image resolution for a captured module FOV image which is stitched together with other captured module FOV images to form a working FOV image of a working area on a planar surface.

The above-described second example step-and-repeat module FOV image capture and assembly process can be characterized by:

- a working FOV region arranged in 8 rows and 12 columns of module FOV regions, where the twelve individual optical modules 1010, 1012, 1014, 1016, 1018, 1020, 1022, 1024, 1026, 1028, 1030, 1032, capture module FOV images of their respective module FOV regions according to:
- a horizontal stagger pitch ($P_H$) of module FOV regions in the same row is two, a vertical stagger pitch ($P_V$) of module FOV regions in separate rows is two, and
- n is a total number of rows which in this example is eight, and
- s is the total number of steps, which in this example equals 10, and
- where the step-and-repeat assembly process achieves an efficiency of capturing module-captured images, and stitching adjacent module-captured images, based on the efficiency formula=number of rows divided by number of steps.

In this example, the efficiency for the step-and-repeat assembly process is 8/10=0.8.

Figure 11:
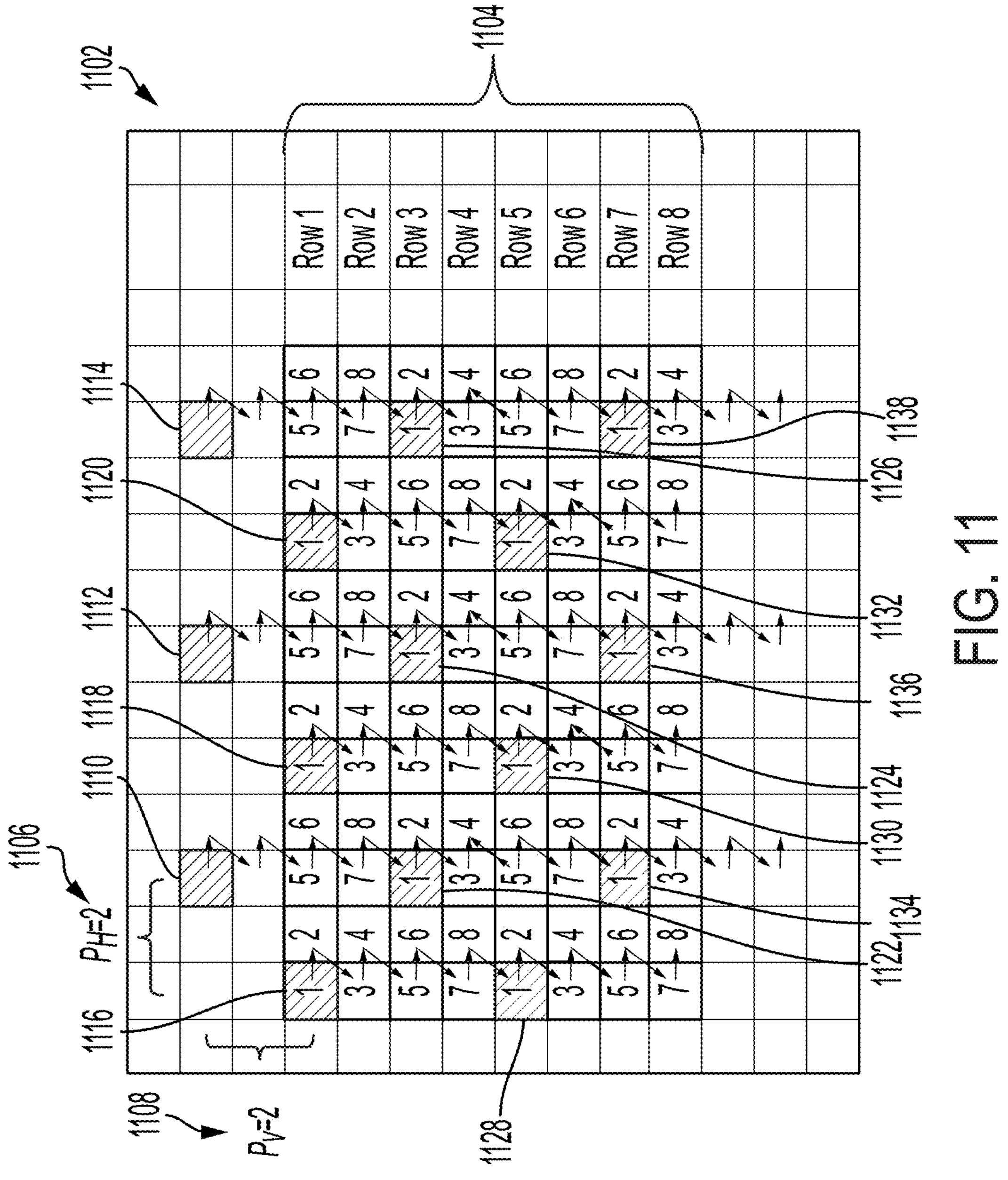
FIG. 11 is a top view of a plurality of module FOV regions on a planar working surface, from which to capture images by fifteen individual optical modules in a staggered FOV stitching geometry using a step-and-repeat assembly process in which a horizontal pitch is two and a vertical pitch is two.

FIG. 11 illustrates a third example plurality of module FOV regions in a working area on a planar working surface 1102, which is shown arranged in 8 rows 1104 by twelve columns from which to capture images by fifteen individual optical modules 1110, 1112, 1114, 1116, 1118, 1120, 1122, 1124, 1126, 1128, 1130, 1132, 1134, 1136, 1138, in a staggered FOV stitching geometry using a step-and-repeat assembly process in which a horizontal pitch 1106 is two and a vertical pitch 1108 is two.

As shown in FIG. 11, three optical modules 1116, 1118, 1120, start in row number 1, three optical modules 1122, 1124, 1126, start in row number 3, three optical modules 1128, 1130, 1132, start in row number 5, and three optical modules 1134, 1136, 1138, start in row number 7, and three optical modules 1110, 1112, 1114, start in a row that is two vertical module FOV positions above row number 1 and outside of the working area.

The three optical modules 1116, 1118, 1120, in row number 1, the three optical modules 1122, 1124, 1126, in row number 3, the three optical modules 1128, 1130, 1132, in row number 5, and the three optical modules 1134, 1136, 1138, in row number 7, immediately capture a module FOV image at step position number 1, as shown. Then, these same modules move to step position number 2 in respective rows number 1, 3, 5, and 7, and capture a module FOV image at step position number 2. The fifteen individual optical modules 1110, 1112, 1114, 1116, 1118, 1120, 1122, 1124, 1126, 1128, 1130, 1132, 1134, 1136, 1138, all move in one synchronized group movement following the numbered step-and-repeat sequence 1 to 8, to capture images from the respective module FOV regions in the working area on the planar working surface 1102.

After the optical modules 1116, 1118, 1120, step from row number 1 to row number 2, and then to row number 3, and contemporaneously the second group of three optical modules 1122, 1124, 1126, steps from row number three to row number four, and then to row number five, and the third group of three optical modules 1128, 1130, 1132, steps from row number 5 to row number 6, and then to row number 7, and the fourth group of three optical modules 1134, 1136, 1138, steps from row number 7 to row number 8, and then step outside of the working area, the group of three optical modules 1110, 1112, 1114, reach row number 1 at position number 5. These optical modules 1110, 1112, 1114, start capturing module FOV images at position 5, and then at position 6, and then at position 7, continuing in steps up to position number 8.

A machine vision system arranges the captured module FOV images from the twelve optical modules moving together as one group in a side-by-side module FOV image assembly process. The system prepares the captured module FOV images for an adjacent image stitching operation, possibly performing image processing on individual captured module FOV images. For example, the machine vision system might adjust image resolution for a captured module FOV image to meet certain image resolution requirements such as to enable a microassembler system to detect, identify, and move micro-objects and/or microscale devices located on the planar working surface based on the micro-objects and/or microscale devices being detected and identified in the captured module FOV image. See the discussion above with reference to FIG. 22 for an example of image processing to adjust image resolution for a captured module FOV image which is stitched together with other captured module FOV images to form a working FOV image of a working area on a planar surface.

The above-described third example step-and-repeat module FOV image capture and assembly process can be characterized by:

- a working FOV region arranged in eight rows and twelve columns of module FOV regions, where the fifteen individual optical modules 1110, 1112, 1114, 1116, 1118, 1120, 1122, 1124, 1126, 1128, 1130, 1132, 1134, 1136, 1138, capture module FOV images of their respective module FOV regions according to:
- a horizontal stagger pitch ($P_H$) of module FOV regions in the same row is two,
- a vertical stagger pitch ($P_V$) of module FOV regions in separate rows is two, and
- n is a total number of rows which in this example is eight, and
- s is the total number of steps, which in this example equals 8, and
- where the step-and-repeat assembly process achieves an efficiency of capturing module-captured images, and stitching adjacent module-captured images, based on the efficiency formula=number of rows divided by number of steps.
- =8/8. In this example, the efficiency for the step-and-repeat assembly process is 1.0, which is the highest efficiency for a step-and-repeat assembly process.

Figure 12:
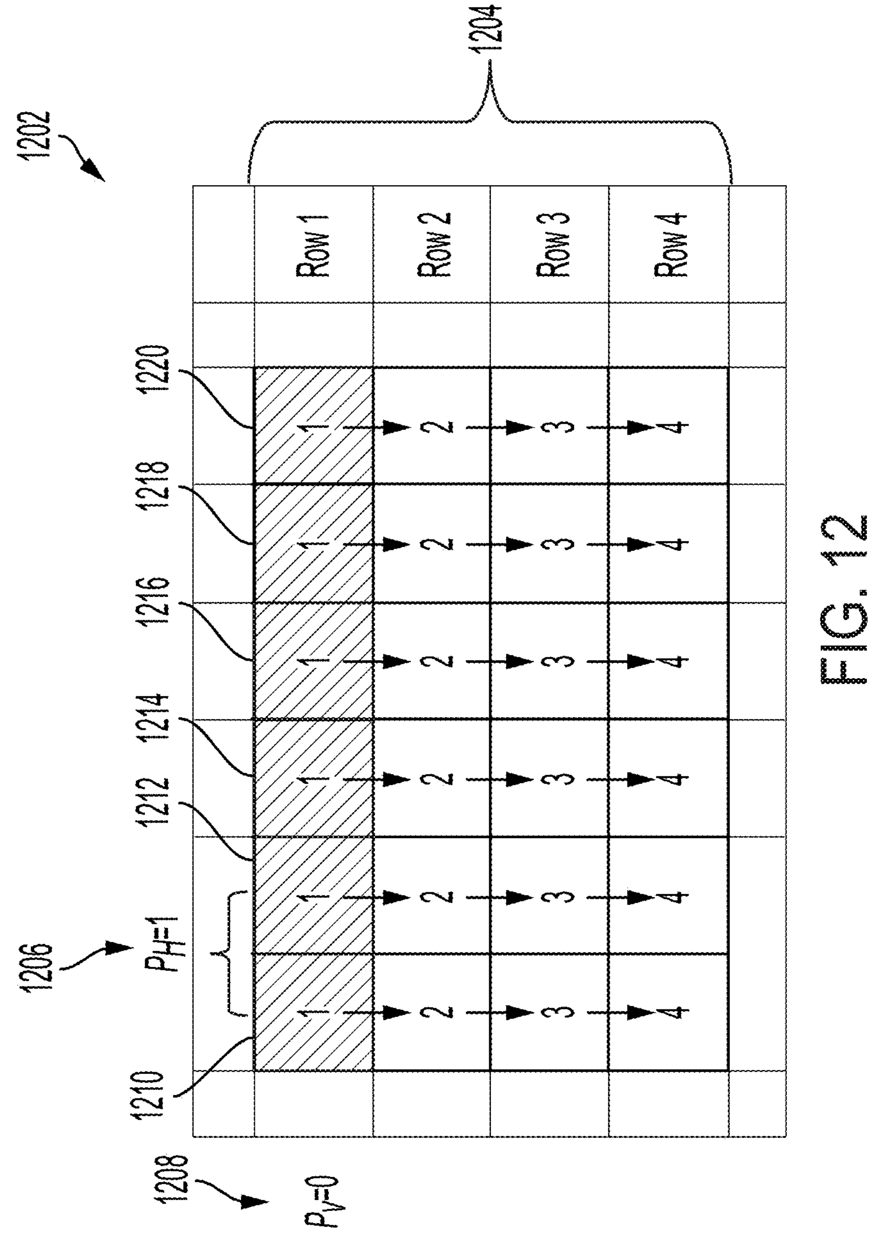
FIG. 12 is a top view of an example plurality of module FOV regions on a planar working surface, from which to capture images by six individual optical modules in a staggered FOV stitching geometry using a step-and-repeat assembly process in which a horizontal pitch is one and a vertical pitch is zero.

FIG. 12 illustrates a fourth example plurality of module FOV regions in a working area on a planar working surface 1202, which is shown arranged in four rows 1204 by six columns from which to capture images by six individual optical modules 1210, 1212, 1214, 1216, 1218, 1220, in a staggered FOV stitching geometry using a step-and-repeat assembly process in which a horizontal pitch 1206 is one and a vertical pitch 1208 is zero.

As shown in FIG. 12, the six optical modules 1210, 1212, 1214, 1216, 1218, 1220, start in row number one and immediately capture a module FOV image at step position number 1, as shown. Then, these same modules move to step position number 2 in row number two and capture a module FOV image at step position number 2. The six individual optical modules 1210, 1212, 1214, 1216, 1218, 1220, all move in one synchronized group movement following the numbered step-and-repeat sequence 1 to 4, to capture images from the respective module FOV regions in the working area on the planar working surface 1202. The six optical modules 1210, 1212, 1214, 1216, 1218, 1220, step from row number one to row number two, to row number three, and to row number four.

A machine vision system arranges the captured module FOV images from the twelve optical modules moving together as one group in a side-by-side module FOV image assembly process. The system prepares the captured module FOV images for an adjacent image stitching operation, possibly performing image processing on individual captured module FOV images. For example, the machine vision system might adjust image resolution for a captured module FOV image to meet certain image resolution requirements, such as to enable a microassembler system to detect, identify, and move micro-objects and/or microscale devices located on the planar working surface based on the micro-objects and/or microscale devices being detected and identified in the captured module FOV image. See the discussion above with reference to FIG. 22 for an example of image processing to adjust image resolution for a captured module FOV image which is stitched together with other captured module FOV images to form a working FOV image of a working area on a planar surface.

The above-described fourth example step-and-repeat module FOV image capture and assembly process can be characterized by:

- a working FOV region arranged in four rows and six columns of module FOV regions, where the six individual optical modules 1210, 1212, 1214, 1216, 1218, 1220, capture module FOV images of their respective module FOV regions according to:
- a horizontal stagger pitch ($P_H$) of module FOV regions in the same row is one,
- a vertical stagger pitch ($P_V$) of module FOV regions in separate rows is zero, and
- n is a total number of rows which in this example is four, and
- s is the total number of steps, which in this example equals 4, and where the step-and-repeat assembly process achieves an efficiency of capturing module-captured images, and stitching adjacent module-captured images, based on the efficiency formula=number of rows divided by number of steps.

In this example, the efficiency for the step-and-repeat assembly process is 4/4=1.0, which is the highest efficiency for a step-and-repeat assembly process.

Figure 13:
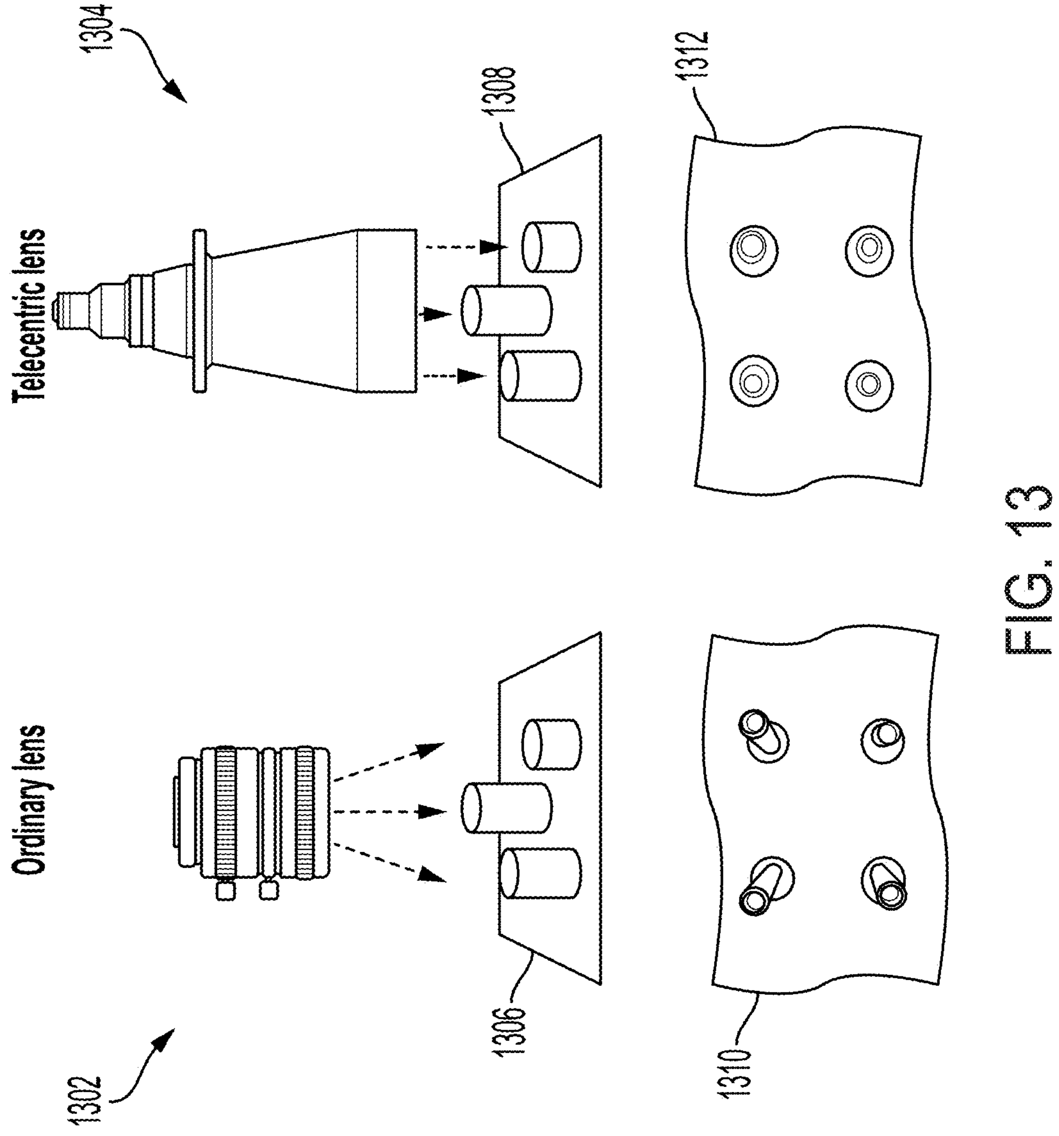
FIG. 13 is an illustration of an example image capture by an optical module with an ordinary lens compared with an example image capture by an optical module with a telecentric lens.

With reference to FIG. 13, a machine vision system according to various embodiments can include optical modules that use ordinary lenses 1302 and alternatively can include optical modules that use telecentric lenses 1304. It should be noted that certain embodiments could use both types of lenses 1302, 1304, as part of optical trains of optical modules.

An ordinary lens element 1302 views objects 1306 on a planar surface and couples light signals therefrom via an optical train to a camera device in which one or more optical sensors capture a module FOV image 1310 as shown. A camera device using an ordinary lens element 1302 can suffer various disadvantages while capturing the module FOV image 1310. The disadvantages can include but are not limited to the following observations. A part of a surface of an object 1306 may be hidden by surface unevenness. The magnification of the captured image 1310 can change relative to the depth of the object 1306. The size of the captured image can change based on the distance from the lens element 1302 to the object 1306 on the planar surface. The ordinary lens element 1302 can cause parallax error in the captured image 1310. The centroid of the object 1306 in the captured image 1310 changes based on the focus or defocus of the lens element 1302. Blurring of the captured image 1310 can vary a-symmetrically with respect to the focus or defocus of the lens element 1302. The appearance of the captured image 1310 can vary across the field-of-view.

On the other hand, the telecentric lens element 1304 does not have a change in magnification with respect to the depth of an object. There is no parallax error. The entire surface of the object 1308 is visible. The size of the captured image 1312 remains the same while varying the distance from the telecentric lens element 1304 to the object 1308 on the planar surface. The centroid of an object remains the same with changing focus (e.g., defocus) of the lens element 1304. Blurring remains symmetrical with respect to changing focus (e.g., defocus) of the lens element 1304. The appearance of the captured image 1312 remains constant across the field-of-view.

However, the telecentric lens element 1304 typically is larger and wider than an image plane within the field-of-view of the lens element 1304. This makes it difficult to stitch side-by-side module FOV images that are adjacent to each other and captured by a telecentric lens element 1304. Due to the telecentric lens element 1304 being larger, in certain implementations of an optical module, it can result in a longer optical train requiring greater distance between the camera device and the object 1308.

Figure 14:
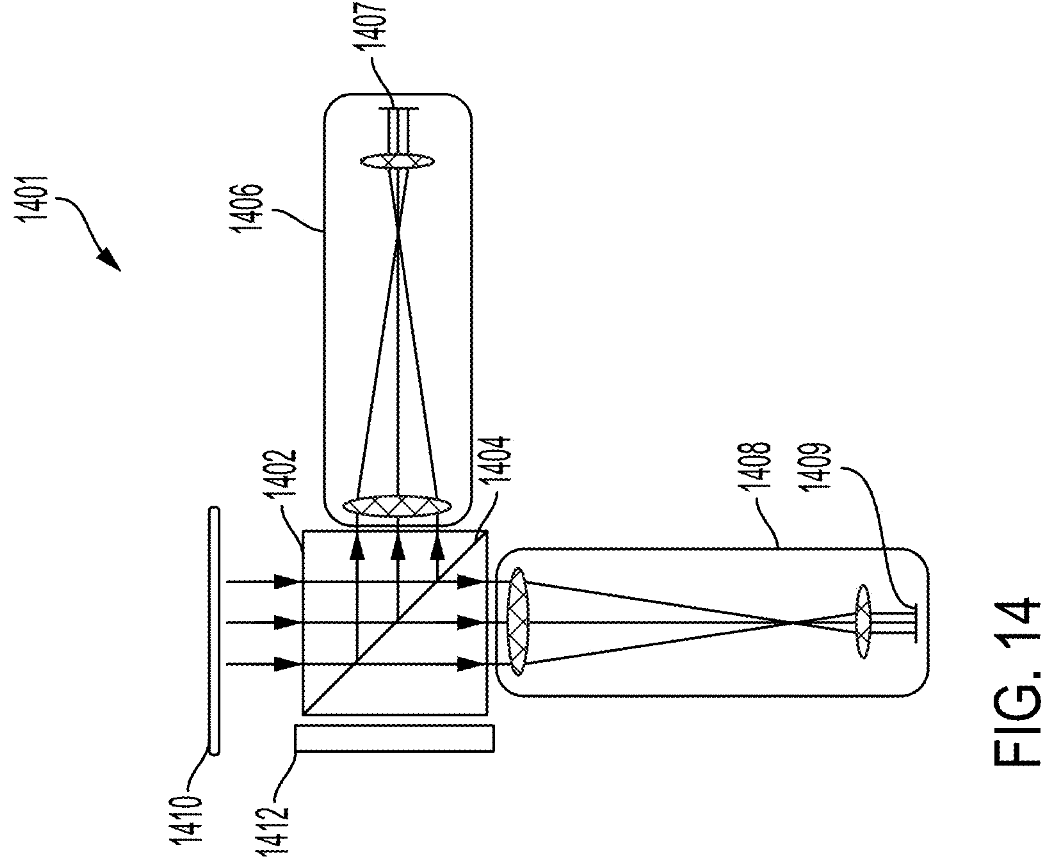
FIG. 14 is a side view of an example plurality of individual optical modules arranged as a FOV optical module array in which each individual optical module includes a telecentric lens optically coupled to a receiving optical train that includes, according to an example implementation, a polarizing beam splitter cube; and see also alternative views of the example shown in FIGS. 24A and 24B.

FIG. 14 is a side view of an example plurality of optical modules 1406, 1408, arranged as a FOV optical module array 1401 where each individual optical module 1406, 1408, includes a telecentric lens element optically coupled to a receiving optical train. The receiving optical train according to the example includes a polarizing beam splitter cube 1402 as shown. The cube 1402 includes a beam splitting element 1404.

A viewing target working area is located on a planar surface of an optically translucent substrate 1410, with a light source (not shown) in this example located above, or in certain embodiments can be located below, the translucent substrate 1410 and in this example the optical module array located below the substrate 1410 as shown, or in certain embodiments can be located above. Light signals from the target working area on the substrate 1410 enter the cube 1402 and are split between a receiving optical train for each optical module 1406, 1408, and a light stop structure 1412 which is used to collect (avoid reflecting) light signals which are coupled from the splitting element 1404 as residual output light signals from the cube 1402 to the light stop structure 1412 or block unwanted light or stray light from entering the splitting element 1404 that would have a direct path to the individual optical modules 1406 and 1408.

Each optical module 1406, 1408, includes a telecentric lens, and optionally other lenses, to collect and direct light signals from the target working area, via the beam splitter element 1404, to a respective optical sensor 1407, 1409, which captures a module FOV image of the target working area.

Figures 24A, 24B:
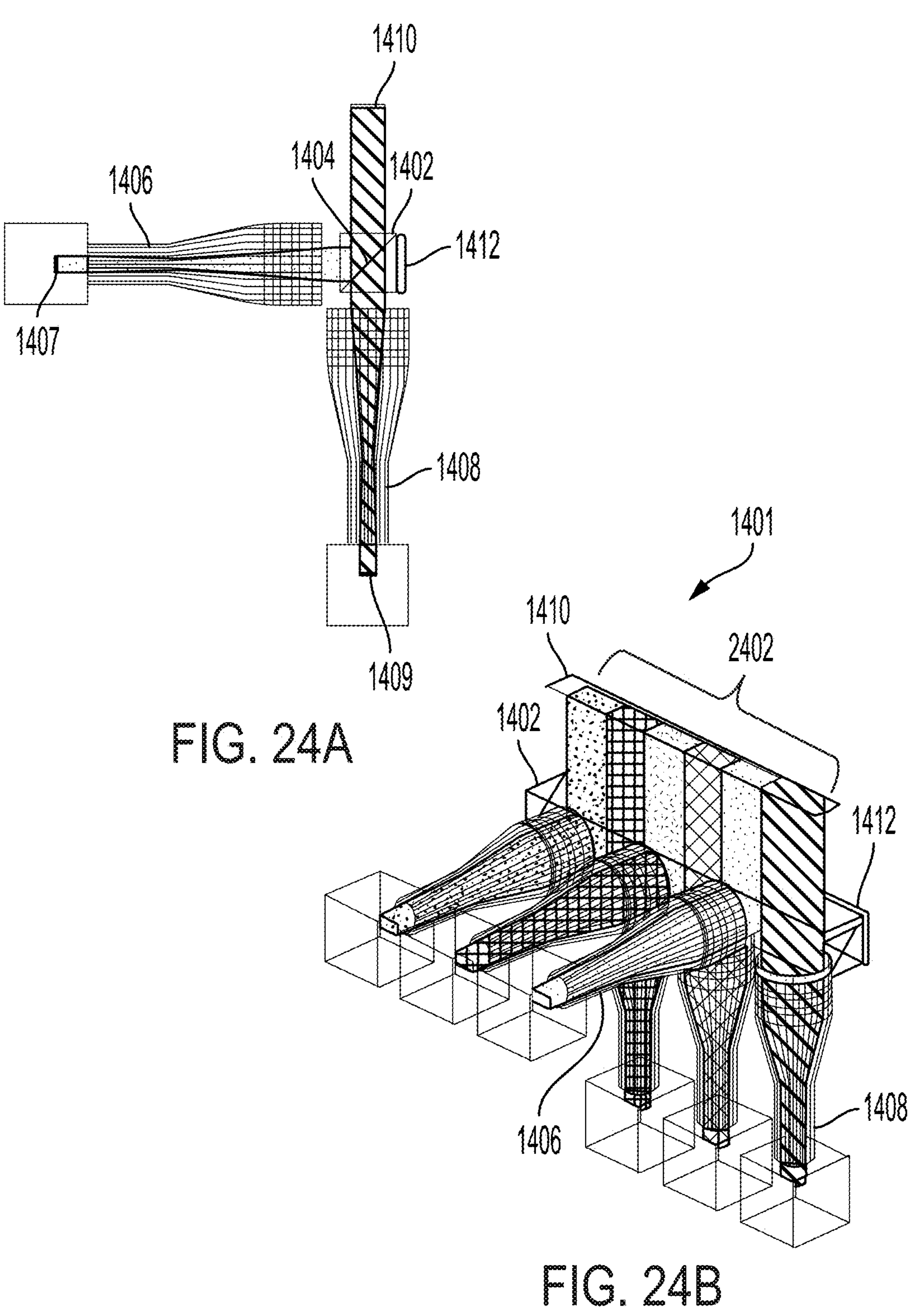

FIGS. 24A and 24B illustrate alternative views of the optical module array 1401 shown in FIG. 14. FIG. 24A shows a side view and FIG. 24B shows a perspective view. In FIG. 24B can be seen optical module array 1401 includes six optical modules. The target working area 2402 is shown on the translucent substrate 1410 including six module FOV regions in the working area 2402. The six module FOV regions in the working area 2402 correspond respectively to six optical modules in the optical module array 1401. Residual output light signals from the cube 1402 are directed to the beam dump structure 1412 as shown.

Figure 23:
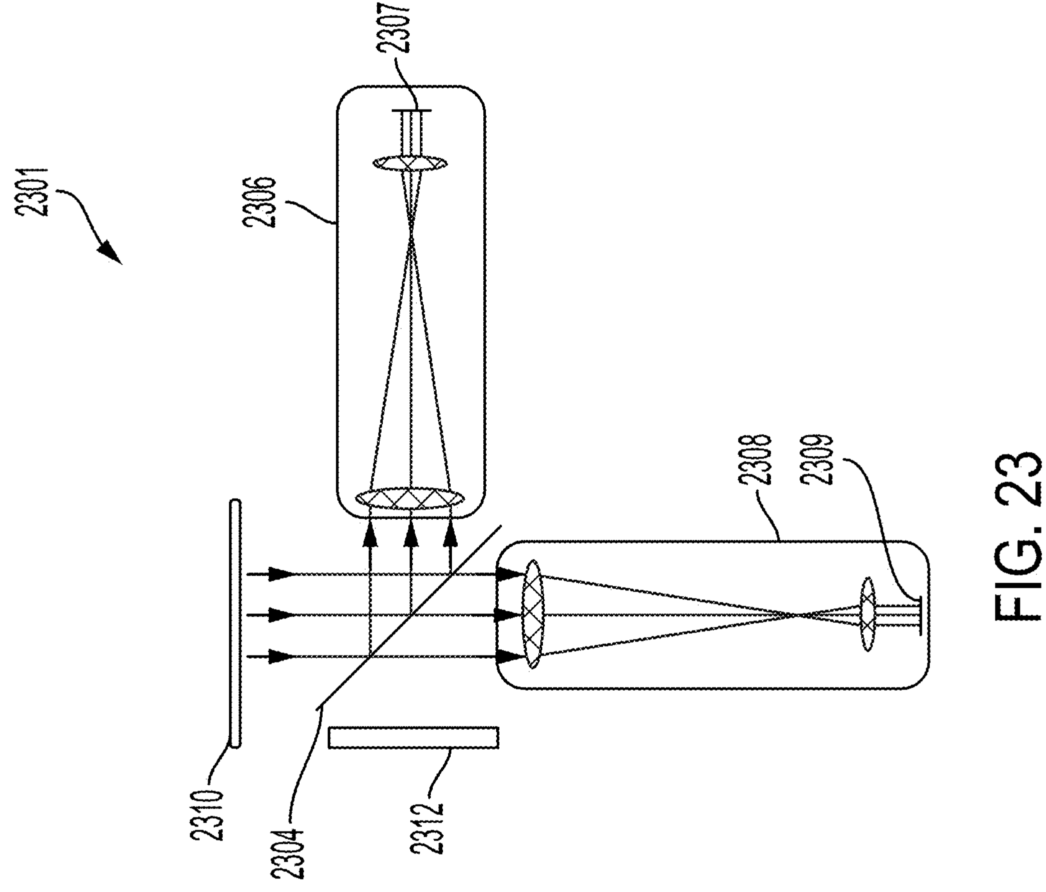
FIG. 23 is a side view of an example plurality of individual optical modules arranged as a FOV optical module array in which each individual optical module includes a telecentric lens optically coupled to a receiving optical train that includes, according to an example implementation, a 50-50 pellicle beam splitter.

FIG. 23 is a side view of an example FOV optical module array 2301 in which each individual optical module 2306, 2308, includes a telecentric lens optically coupled to a receiving optical train that includes, according to this example implementation, a 50-50 pellicle beam splitter 2304. Each optical module 2306, 2308, includes a telecentric lens, and optionally other lenses, to collect and direct light signals from a target working area on a translucent substrate 2310, via the 50-50 pellicle beam splitter 2304, to a respective optical sensor 2307, 2309 which captures a module FOV image of the target working area. Unwanted residual light or stray light that would have a direct path to the individual optical modules 2306 and 2308 are blocked by the light stop structure 2312.

The overall arrangement of the array 2301 is similar to the optical module array 1401 shown in FIG. 14 which has been discussed above. While the beam splitter element 2304 is shown as a 50-50 pellicle beam splitter 2304, according to various embodiments of a machine vision system, an alternative beam splitter structure could be used. For example, a 50-50 plate beam splitter 2304 could be used as alternative to the 50-50 pellicle beam splitter 2304 discussed above.

Figures 15A, 15B:
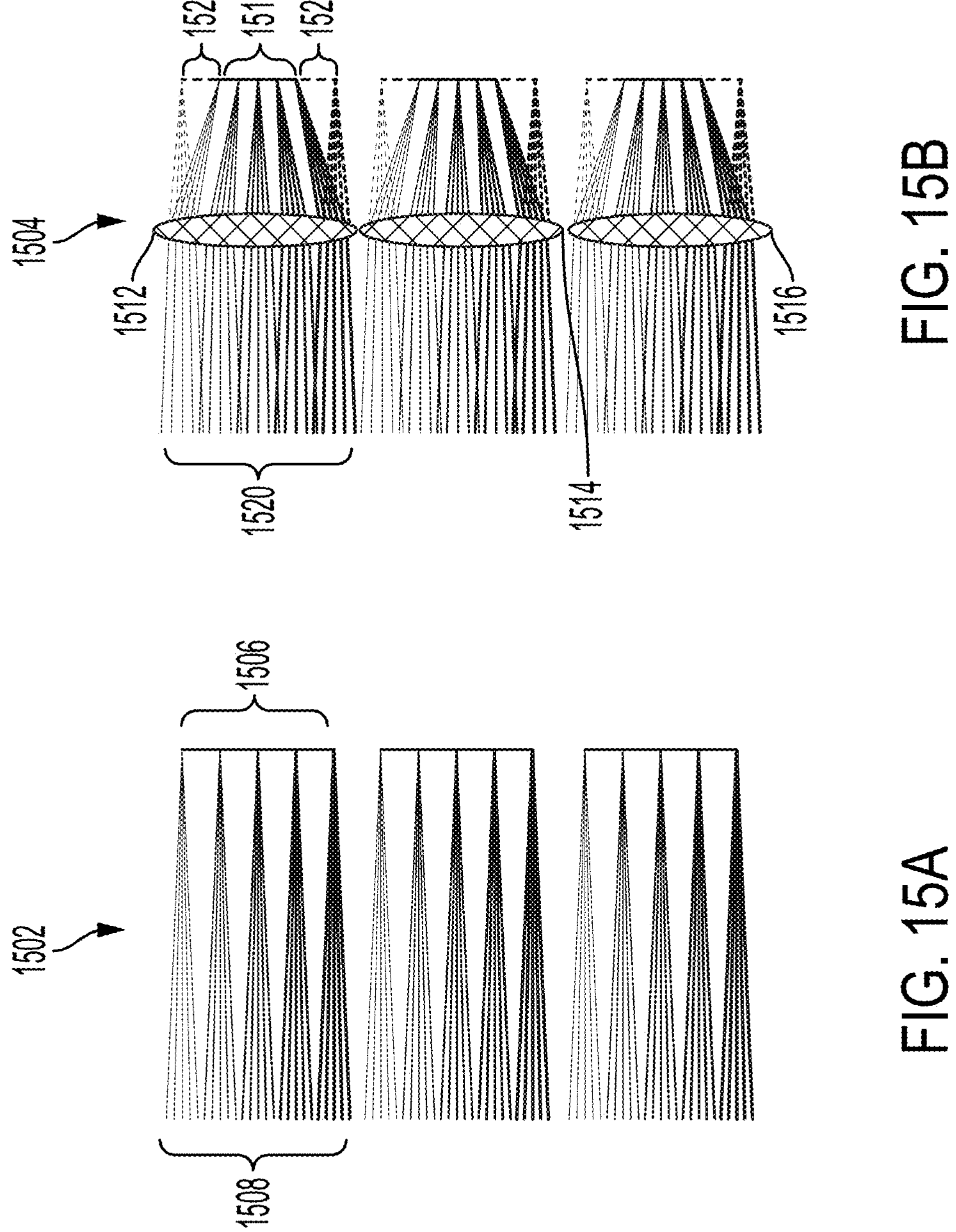
FIGS. 15A and 15B are top views of an example FOV optical module array with individual optical modules alternatively including either normal lenses or microlens arrays for capturing images.

FIGS. 15A and 15B are top views of an example FOV optical module array with individual optical modules alternatively including either normal lenses or microlens arrays for capturing module FOV images. FIG. 15A shows light rays 1502 from a target working area 1506, including micro-objects and/or micro-scale devices. The light rays 1502 are directed by a lens (either an ordinary lens or a telecentric lens) in an optical train of an optical module, to an optical sensor in a camera device of the optical module. The optical sensor captures a module FOV image from the target FOV working area 1506. The light rays 1502 are shown at a certain magnification level 1508. However, at the certain magnification level 1508 the micro-objects and/or micro-scale devices in the captured module FOV image may not be large enough to be identified by the machine visions system.

FIG. 15B shows an alternative arrangement of lenses in the optical train to additionally magnify the captured image at certain local areas where micro-objects and/or micro-scale devices are located. According to the example, the machine visions system can selectively insert a microlens array 1504 in the optical train of an optical module. The microlens array 1504 includes three micro-lenses 1512, 1514, 1516. Each microlens 1512 will focus light rays from a local area 1518 in the target working area 1506, and increase the magnification 1520 such that the micro-objects and/or micro-scale devices in the captured image of the local area 1518 are large enough to be identified by the machine visions system.

Outside of the local area 1518 in the target working area, however, there can be one or more other areas 1522, 1524, from which a captured image is not magnified by the microlens 1512. Therefore, any micro-objects and/or micro-scale devices in a captured image of these other areas 1522, 1524, may not be large enough to be identified by the machine visions system.

In various implementations of a machine visions system, the microlens array 1504 provides an image processing tool to increase resolution of captured images of certain local areas 1518 with sufficiently high resolution to allow the machine visions system to identify micro-objects and/or micro-scale devices in the certain local areas 1518. This image processing creates a foveal region increasing a native resolution in a neighborhood of desired device position datums or locations in the optical module captured image. This image information enables a microassembler system to handle a large working area application.

Figure 16:
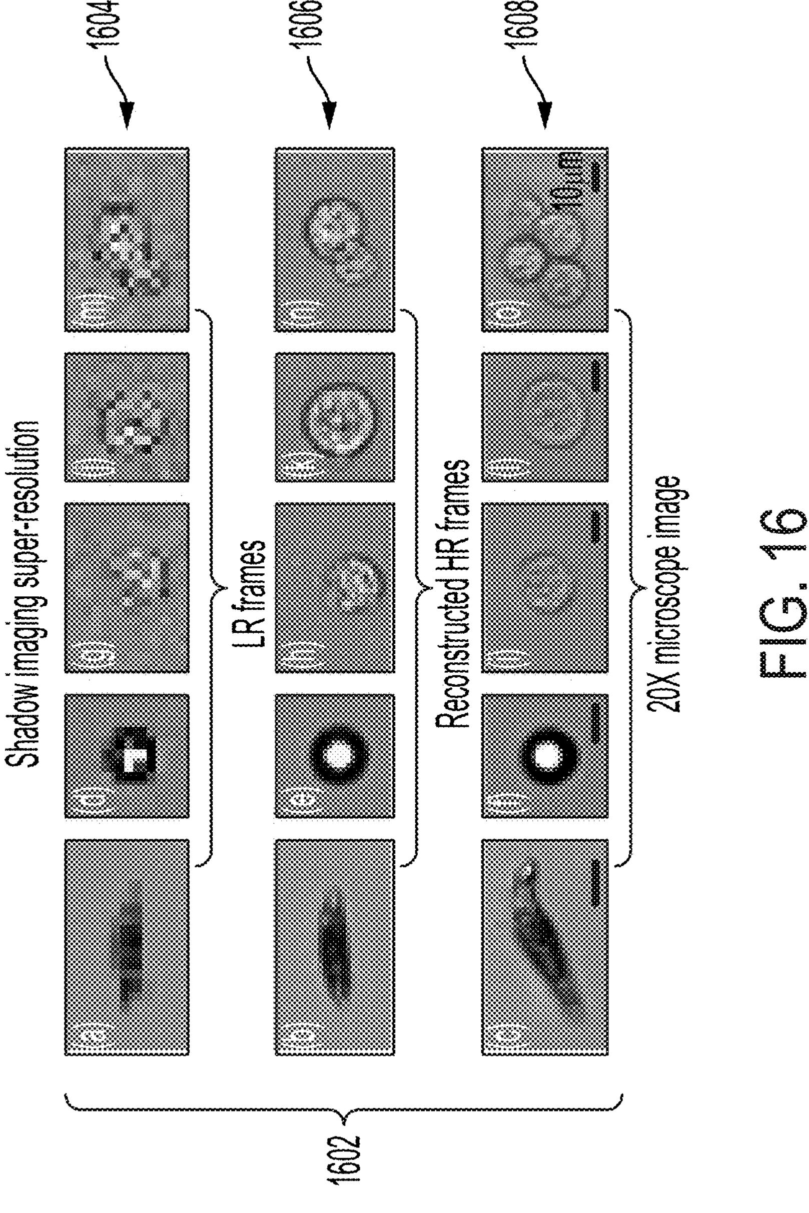
FIG. 16 shows an example of super-resolution image processing suitable for use in an example of the present disclosure.

FIG. 16 shows an example of super-resolution image processing 1602 for use in an example machine vision system to identify micro-objects and/or micro-scale devices in a module FOV working area. The machine vision system can perform super-resolution imaging on sets of sub-pixels in an optical module captured image 1604 to produce a higher resolution image 1606, 1608, of the optical module captured image 1604. This higher resolution image enables the machine visions system to identify and locate the micro-objects and/or micro-scale devices in the working area on the planar surface. This captured image-based information is provided to a microassembler system, for example, to adjust the position of at least one micro-object on a planar working surface in a micro-assembly process. The process of adjusting the position of the at least one micro-object includes at least one of the following operations: performing fine alignment of at least one micro-object on the planar working surface in the micro-assembly process; performing alignment verification of at least one micro-object on the planar working surface in the micro-assembly process; or performing right-side-up verification of at least one micro-object on the planar working surface in the micro-assembly process.

A standard super-resolution method involves capturing several to many low-resolution images where each image is shifted in sub-pixel increments. These images can be produced by using a pixel-shifting electro-mechanical device to capture sequential images that have been moved on the image sensor in sub-pixel increments. Another method involves sequentially capturing images as the object moves or flows. These sub-pixel shifted low-resolution images are combined to produce a computationally re-constructed single high-resolution image.

Figure 17:
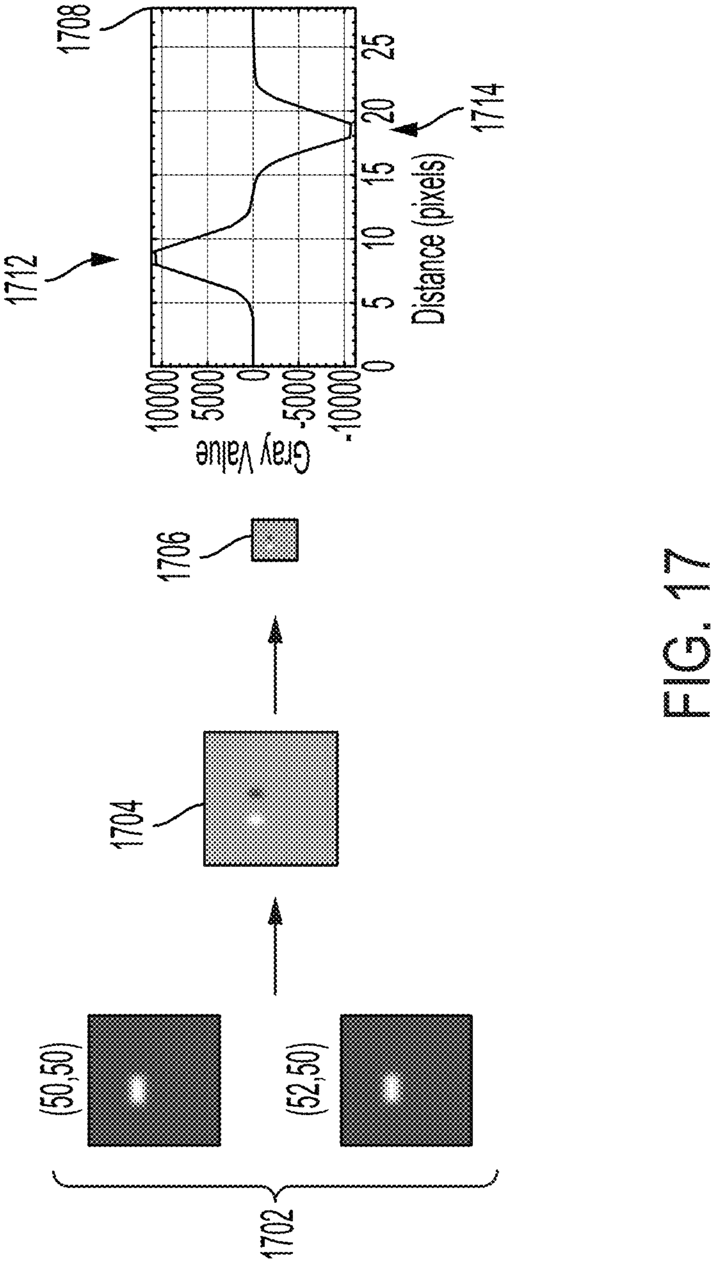
FIG. 17 shows an example of grayscale image processing suitable for use in an example of the present disclosure.

FIG. 17 shows an example of grayscale image processing for use in an example machine vision system. The grayscale image processing 1702, 1704, 1706, detects a centroid of each of at least one micro-object in an optical module captured image 1702 and provides the image information 1708, 1712, 1714, to a microassembler system to, for example, adjust the position of at least one micro-object on a planar working surface in a micro-assembly process. The process of adjusting the position of the at least one micro-object can include rotation of the micro-object on the planar working surface in the micro-assembly process. The process of adjusting the position of the at least one micro-object can include performing rough alignment of a plurality of micro-objects to each other in the micro-assembly process. Processing of grayscale images involve standard techniques like image subtraction, thresholding, binarization, edge detection and sharpening, etc., to extract and isolate object features, separate low resolution images of overlapped or adjacent objects, identify object centroid positions, etc.

Figure 18:
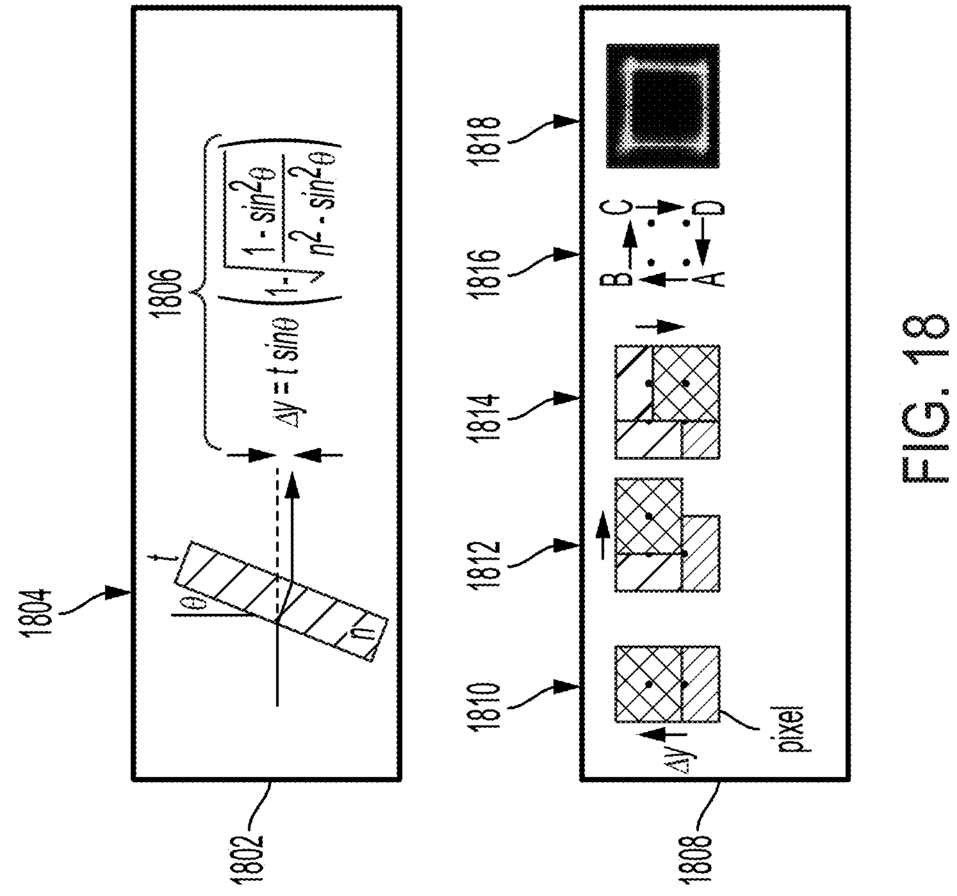
FIG. 18 shows an example of pixel-shifting image processing suitable for use in an example of the present disclosure.

FIG. 18 shows an example of pixel-shifting image processing suitable for use in an example of the present disclosure. The machine visions system can adjust 1802, 1804, 1806, the optical module captured image by performing pixel shifting 1808, 1810, 1812, 1814, 1816, 1818, on sets of sub-pixels in the captured image to produce a higher resolution image of the original module captured image. Pixel shifting or image shifting is performed by tilting a window that is positioned in front of the image sensors. Light rays incident on the window undergo a small displacement as they propagate through a tilted window. The larger the tilt, the larger the displacement. This can be used to shift the image formed by the lens in both in the horizontal and in the vertical directions on the image sensor. A sequence of images, each shifted in sub-pixel increments in both directions, are captured. These sub-pixel shifted low-resolution images are then combined to produce a computationally re-constructed single high-resolution image.

Figure 19:
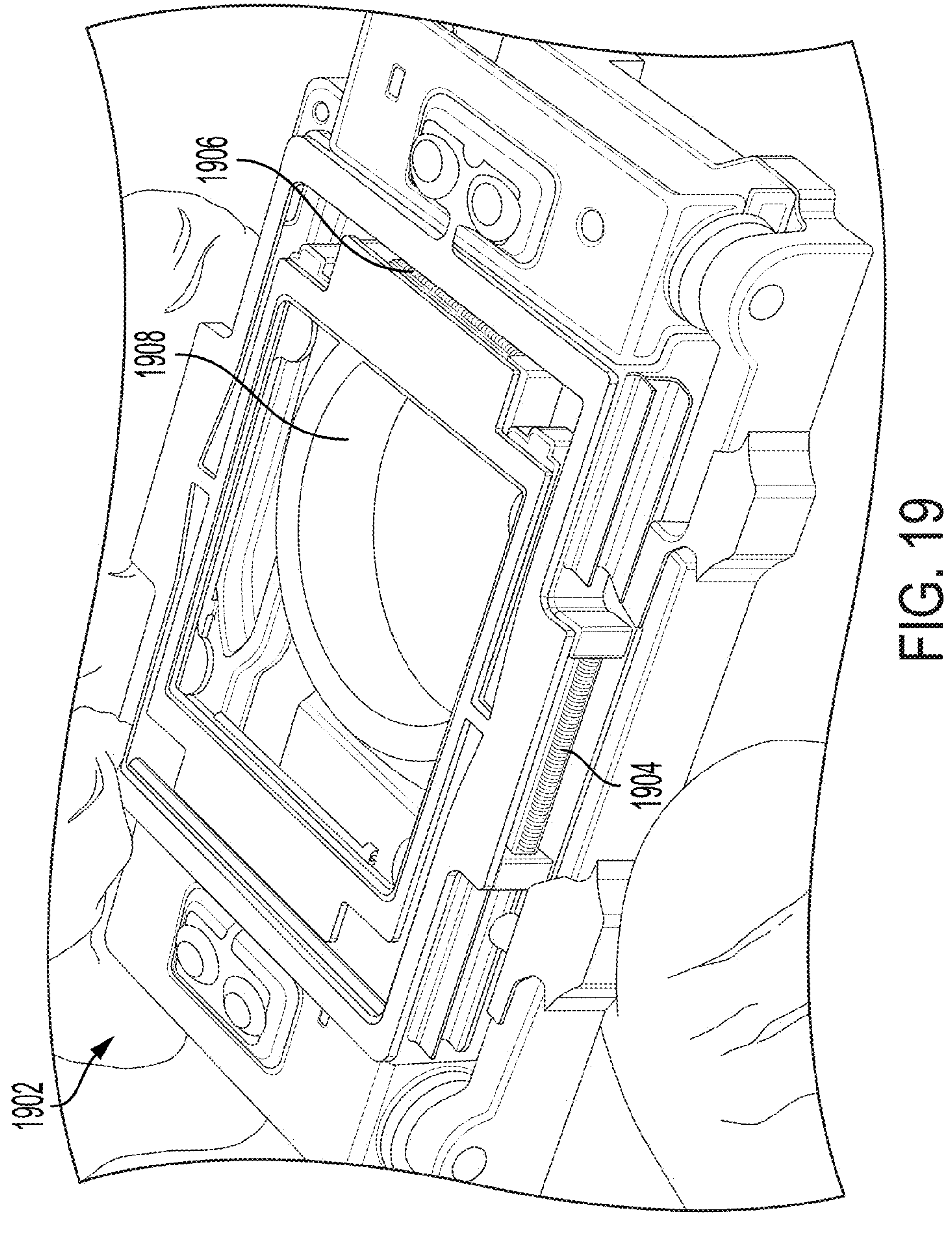
FIG. 19 shows an example electro-mechanical device suitable for use in the pixel shifting image processing shown in FIG. 18.

FIG. 19 shows an example pixel-shifting electro-mechanical device 1902 which includes a set of electrical driving coils 1904, 1906, that a machine vision system can selectively energize to move and change the position of (e.g., to tilt) a glass window (e.g., a lens) 1908 in one or more axes to project each pixel in two/four adjacent locations in an image thereby increasing the apparent resolution of the captured image. For example, pixels can be shifted horizontally and vertically in four directions clockwise at 240 Hz to achieve true 4K resolution. This pixel-shifting electro-mechanical device 1902 is suitable for use in the pixel shifting image processing technology shown in FIG. 18 and discussed in more detail above.

Figure 20:
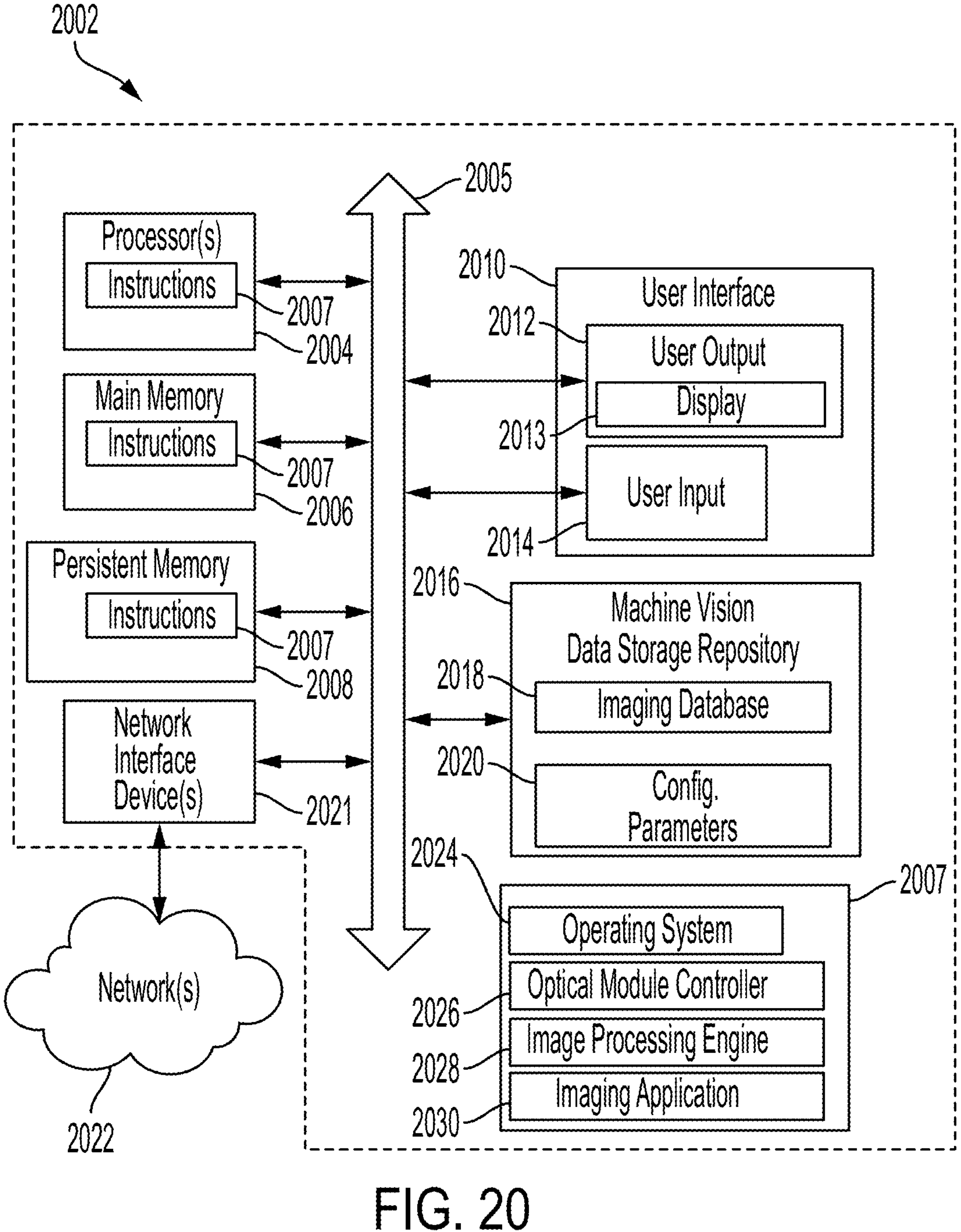
FIG. 20 is a system block diagram illustrating an example machine vision system suitable for use with a microassembler system, according to an example of the present disclosure.

Example of a Machine Vision System Including a Processing System Operating in a Network FIG. 20 illustrates an example of a processing system 2002 (also referred to as a computer system) suitable for use to perform the example methods discussed herein in a machine vision system communicatively coupled with a microassembler system, according to an example of the present disclosure. The processing system 2002 according to the example is communicatively coupled with a communication network 2022 which can comprise a plurality of networks. This simplified example is not intended to suggest any limitation as to the scope of use or function of various example embodiments of the invention described herein.

The example processing system 2002 comprises a computer system/server, which is operational with numerous other general purpose or special purpose computing system environments or configurations. Examples of well-known computing systems, environments, and/or configurations that may be suitable for use with such a computer system/ server include, but are not limited to, personal computer systems, server computer systems, thin clients, thick clients, hand-held or laptop devices, multiprocessor systems, microprocessor-based systems, and distributed cloud computing environments that include any of the above systems and/or devices, and the like.

The processing system 2002 may be described in a general context of computer system executable instructions, such as program modules, being executed by a computer system. Generally, program modules may include methods, functions, routines, programs, objects, components, logic, data structures, and so on that perform particular tasks or implement particular abstract data types. A processing system 2002, according to various embodiments, may be practiced in distributed networking environments where tasks are performed by remote processing devices that are linked through a communications network.

Referring more particularly to FIG. 20, the following discussion will describe a more detailed view of an example processing system 2002. According to the example, at least one processor 2004 is communicatively coupled with system main memory 2006 and persistent memory 2008.

A bus architecture 2005 facilitates communicative coupling between the at least one processor 2004 and the various component elements of the processing system 2002. The bus architecture 2005 represents one or more of any of several types of bus structures, including a memory bus, a peripheral bus, an accelerated graphics port, and a processor bus or local bus using any of a variety of bus architectures.

The system main memory 2006, in one example, can include computer system readable media in the form of volatile memory, such as random access memory (RAM) and/or cache memory. By way of example only, a persistent memory storage system 2008 can be provided for reading from and writing to any one or more of: a non-removable, non-volatile magnetic media (not shown and typically called a "hard drive"), or a solid state drive (SSD) (also not shown), or both. In such instances, each persistent memory storage system 2008 can be connected to the bus architecture 2005 by one or more data media interfaces. As will be further depicted and described below, the at least one processor 2004, the main memory 2006, and the persistent memory 2008, may include a set (e.g., at least one) of program modules 2007 that can be configured to carry out functions and features of various embodiments of the invention.

A program/utility, having a set (at least one) of program modules, may be stored in persistent memory 2008 by way of example, and not limitation, as well as an operating system 2024, one or more application programs or applications 2030, other program modules, and program data. Each of the operating system 2024, one or more application programs 2030, other program modules, and program data, or some combination thereof, may include an implementation of interface software to a networking environment. Program modules generally may carry out the functions and/or methodologies of various embodiments of the invention as described herein.

The at least one processor 2004 is communicatively coupled with one or more network interface devices 2021 via the bus architecture 2005. The network interface device 2021 is communicatively coupled, according to various embodiments, with one or more networks 2022. The network interface device 2021 can communicate with one or more networks 2022 such as a local area network (LAN), a general wide area network (WAN), and/or a public network (e.g., the Internet). The network interface device 2021, according to the example, facilitates communication between the processing system 2002 and other nodes in the network(s) 2022.

A user interface 2010 is communicatively coupled with the at least one processor 2004, such as via the bus architecture 2005. The user interface 2010, according to the present example, includes a user output interface 2012 and a user input interface 2014. Examples of elements of the user output interface 2012 can include a display 2013, a speaker, one or more indicator lights, one or more transducers that generate audible indicators, and a haptic signal generator. Examples of elements of the user input interface 2014 can include a keyboard, a keypad, a mouse, a track pad, a touch pad, and a microphone that receives audio signals. The received audio signals, for example, can be converted to electronic digital representation and stored in memory, and optionally can be used with voice recognition software executed by the processor 2004 to receive user input data and commands.

Computer instructions 2007 can be at least partially stored in various locations in the processing system 2002. For example, at least some of the instructions 2007 may be stored in any one or more of the following: in an internal cache memory in the one or more processors 2004, in the main memory 2006, and in the persistent memory 2008.

The instructions 2007, according to the example, can include computer instructions, data, configuration parameters 2020, and other information that can be used by the at least one processor 2004 to perform features and functions of the processing system 2002 and of the machine vision system. According to the present example, the instructions 2007 include an optical module controller 2026 which operates to control one or more optical modules of the machine vision system. The instructions 2007 also include an image processing engine 2028 which operates to process images captured by the one or more optical modules of the machine vision system. The instructions 2007 also include an imaging application 2030 which performs features and functions of the machine vision system and how it interoperates with a microassembler system. The instructions 2007 also include a set of configuration parameters that can be used by the optical module controller 2026, the image processing engine 2028, and the imaging application 2030, as further discussed herein. Additionally, the instructions 2007 include configuration data for the processing system 2002.

The at least one processor 2004, according to the example, is communicatively coupled with a Machine Vision Data Storage Repository 2016 (also referred to herein as the MVDR 2016). The MVDR 2016 can store data for use by the image processing engine 2028 and the imaging application 2030, and related methods, which can include an imaging database 2018 that can store at least a portion of one or more captured image data sets, image processing information from the image processing engine 2028, and history information associated with captured image data sets, image processing algorithms, and associated parameter settings. Various functions and features of one or more embodiments of the present invention, as have been discussed above, may be provided with use of the data stored in the MVDR 2016.

FIG. 21 is an operational flow diagram illustrating an example method of operation of a machine vision system including a processing system 2002 such as shown in FIG. 20.

The at least one processor 2004 in the processing system 2002 enters the operational sequence shown in FIG. 21, at step 2102, and proceeds to arrange, at step 2104, a plurality of individual optical image capture modules (IM) 204, 206, 208, 210, 212, 214, of a machine vision system in an optical module array 202 (see FIG. 2 to FIG. 6) over a working optical inspection region 102 on a planar working surface supporting at least one micro-object. Each optical module 204, 206, 208, 210, 212, 214, includes a receiving optical train optically coupled to a camera device 30. The optical train couples light signals 205 to one or more optical sensors (see an example optical sensor 1407,1409, shown in FIG. 14) in the camera device 306 from an optical module field-of-view which is associated with a module FOV inspection region defined by width 310 and height 312 on the planar working surface. The machine vision system has a defined plurality of optical module FOV regions 310, 312, and associated respective module FOV captured images 705, 707, 709, 711, 713, 715, etc., (see FIG. 7) that cover the overall working optical inspection region 108, 110, on the planar working surface.

The processor 2004 then, at step 2106, captures by each optical module 204, 206, 208, 210, 212, 214, an individual modular captured image (IMI) 705, 707, 709, 711, 713, 715, which has an associated image resolution.

Continuing with the example operational sequence, the processor 2004 then, at step 2108, adjusts a resolution of at least one module captured image 705, 707, 709, 711, 713, 715, of a respective at least one optical module in the array 202, to match a target resolution of an overall working FOV optical inspection region image 2212 (see FIG. 22) of a working area 108, 110. The target resolution is selected by the machine vision system to allow the machine vision system to view and identify in the respective module captured image 705, 707, 709, 711, 713, 715, at least one micro-object located therein on the planar working surface.

Then, at step 2110, while there remains at least one predefined optical module inspection region 310, 312, from which to capture a module FOV image 705, 707, 709, 711, 713, 715, for the machine vision system to completely view the overall working FOV optical inspection region 2212 (see FIG. 22) on the planar working surface, move at least one of the plurality of optical modules 204, 206, 208, 210, 212, 214, of the machine vision system over the at least one remaining predefined optical module inspection region 310, 312. Then, capture an individual module FOV image 705, 707, 709, 711, 713, 715, associated with the at least one remaining predefined optical module FOV inspection region 310, 312. Then, optionally adjust the resolution of the optical module FOV captured image associated with the at least one remaining predefined optical module inspection region 310, 312.

Continuing with the example operational sequence, the processor 2004 interoperating with the image processing engine 2028 then, at step 2112, performs an image stitching operation that stitches together adjacent individual module FOV captured images associated with respective adjacent optical module FOV inspection regions 310, 312, to form a machine vision system overall field-of-view image 2212 associated with the overall working optical inspection region 108, 110, on the planar working surface. The processor then exits the operation sequence, at step 2114.

Non-Limiting Examples

The present invention may be implemented as a system and/or a method, at any possible technical detail level of integration. A computer program may include computer readable program instructions thereon for causing a processor to carry out aspects of the present invention.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on a user's computer, partly on a user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer programs, according to various embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special-purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer programs, according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method for operating a machine vision system suitable for use with a microassembler system for inspection of assembly of micro-objects on a planar working surface, the method comprising:

providing a plurality of optical-image-capture modules (optical modules) arranged over, or under, a planar working surface, wherein each module having a module field-of-view (FOV) and a module captured-image resolution both associated with a module FOV region on the planar working surface, and wherein each module in the plurality including a receiving optical train and a camera device optically coupled with the receiving optical train, the receiving optical train configured to couple light signals received from the module FOV region on the planar working surface to the camera device, and wherein a plurality of module FOV regions on the planar working surface, respectively associated with the plurality of modules, collectively forming a working FOV and a working captured image resolution both associated with a working FOV region on the planar working surface for a machine vision system;

capturing by the camera device of each module in the plurality a respective module-captured image of a module FOV region on the planar working surface;

adjusting the module-captured image of at least one module in the plurality, wherein the adjusting includes detecting at least one micro-object in the module-captured image of the module FOV region on the planar working surface, and adjusting a position of the at least one micro-object on the planar working surface in a micro-assembly process; and stitching together a plurality of module-captured images of adjacent modules in the plurality; and forming, based on the plurality of module-captured images stitched together, the working FOV region associated with the working captured image resolution for the machine vision system, wherein the working FOV region is larger than each module FOV region and the working captured image resolution is at least equal to or greater than each module-captured image resolution respectively associated with each module FOV region.

2. The method of claim 1, wherein the stitching comprises side-by-side stitching of module-captured images of adjacent module FOV regions to form a working captured image of the working FOV region.

3. The method of claim 1, wherein the stitching comprises feathered stitching of module-captured images of adjacent module FOV regions to form a working captured image of the working FOV region.

4. The method of claim 1, wherein the stitching comprises staggered stitching of module-captured images of adjacent module FOV regions to form a working captured image of the working FOV region.

5. The method of claim 4, wherein the staggered stitching comprises a stitching geometry based on a step-and-repeat assembly process to stitch module-captured images of adjacent module FOV regions.

6. The method of claim 5, wherein the step-and-repeat assembly process comprises:

a working FOV region arranged in rows and columns of module FOV regions, where the plurality of modules capture images of their respective module FOV regions according to:

a horizontal stagger pitch ($P_H$) of module FOV regions in the same row, a vertical stagger pitch ($P_V$) of module FOV regions in separate rows, and n is a total number of rows, and s is a total number of steps, and wherein the step-and-repeat assembly process achieves an efficiency of capturing module-captured images, and stitching adjacent module-captured images based on a formula:

=number of rows divided by number of steps $$=n/(P_H(P_V+n)).$$

7. The method of claim 6, wherein $P_H$ equals $P_V$ equals 1, n is a number greater than or equal to 100, and the efficiency is approximately 1, within a tolerance of plus or minus one tenth.

8. The method of claim 6, wherein $P_H$ equals 1, $P_V$ is less than or equal to 10, n is a number greater than or equal to 1000, and the efficiency is approximately 1, within a tolerance of plus or minus 0.01.

9. The method of claim 1, wherein the adjusting the module-captured image comprises using a micro-lens array to create a foveal region increasing a native resolution in a neighborhood of desired device position datums or locations in the module-captured image.

10. The method of claim 1, wherein the adjusting the module-captured image comprises performing grayscale imaging to detect a centroid of each of at least one micro-object in the module-captured-image of the module FOV region on the planar working surface and adjusting a position of the at least one micro-object on the planar working surface in a micro-assembly process.

11. The method of claim 10, wherein adjusting the position of the at least one micro-object includes rotation of the micro-object on the planar working surface in the micro-assembly process.

12. The method of claim 10, wherein the at least one micro-object comprises a plurality of micro-objects, and adjusting the position of the at least one micro-object includes performing rough alignment of the plurality of micro-objects to each other in the micro-assembly process.

13. The method of claim 1, wherein adjusting the module-captured image comprises performing super-resolution imaging on sets of sub-pixels in the module-captured image to produce a higher resolution image of the module-captured image, and wherein at least one optical-image-capture module in the plurality comprises:

a receiving optical train including a high-resolution machine vision macro lens comprising a magnification 0.25× to 1.75× macro lens.

14. The method of claim 1, wherein the adjusting the module-captured image comprises performing pixel shifting on sets of sub-pixels in the module-captured image to produce a higher resolution image of the module-captured image.

15. The method of claim 1, wherein the adjusting the module-captured image comprises performing a combination of at least two image processing methods selected from the following list of image processing methods:

using a micro-lens array to create a foveal region increasing a native resolution in a neighborhood of desired device position datums or locations in the module-captured image;

performing grayscale imaging to detect a centroid of each of at least one micro-object in the module-captured-image and adjusting a position of the at least one micro-object on the planar working surface;

performing super-resolution imaging on sets of sub-pixels in the module-captured image to produce a higher resolution image of the module-captured image; or performing pixel shifting on sets of sub-pixels in the module-captured image to produce a higher resolution image which is higher than a native resolution of the module-captured image.

16. The method of claim 1, wherein a width of an overall working FOV region on the planar working surface is at least ten times larger than a width of any one module FOV region in the plurality of module FOV regions on the planar working surface, and a resolution of the captured-image of the overall working FOV region is at least equal to or greater than the resolution of any module FOV captured image from the plurality of module FOV regions on the planar working surface.

17. A method for operating a machine vision system suitable for use with a microassembler system for inspection of assembly of micro-objects on a planar working surface, the method comprising:

providing a plurality of optical-image-capture modules (optical modules) arranged over, or under, a planar working surface, wherein each module having a module field-of-view (FOV) and a module captured-image resolution both associated with a module FOV region on the planar working surface, and wherein each module in the plurality including a receiving optical train and a camera device optically coupled with the receiving optical train, the receiving optical train configured to couple light signals received from the module FOV region on the planar working surface to the camera device, and wherein a plurality of module FOV regions on the planar working surface, respectively associated with the plurality of modules, collectively forming a working FOV and a working captured image resolution both associated with a working FOV region on the planar working surface for a machine vision system;

capturing by the camera device of each module in the plurality a respective module-captured image of a module FOV region on the planar working surface;

adjusting the module-captured image of at least one module in the plurality, wherein the adjusting includes adjusting a module-captured image resolution; and stitching together a plurality of module-captured images of adjacent modules in the plurality; and forming, based on the plurality of module-captured images stitched together, the working FOV region associated with the working captured image resolution for the machine vision system, wherein the working FOV region is larger than each module FOV region and the working captured image resolution is at least equal to or greater than each module-captured image resolution respectively associated with each module FOV region, wherein the adjusting the module-captured image comprises performing super-resolution imaging on sets of sub-pixels in the module-captured image to produce a higher resolution image of the module-captured image, detecting at least one micro-object in the module-captured-image of the module FOV region on the planar working surface, and adjusting a position of the at least one micro-object on the planar working surface in a micro-assembly process.

18. The method of claim 17, wherein the adjusting the position of the at least one micro-object includes at least one operation selected from the following operations:

performing fine alignment of at least one micro-object on the planar working surface in the micro-assembly process;

performing alignment verification of at least one micro-object on the planar working surface in the micro-assembly process; or performing right-side-up verification of at least one micro-object on the planar working surface in the micro-assembly process.

19. A method for operating a machine vision system suitable for use with a microassembler system for inspection of assembly of micro-objects on a planar working surface, the method comprising:

providing a plurality of optical-image-capture modules (optical modules) arranged over, or under, a planar working surface, wherein each module having a module field-of-view (FOV) and a module captured-image resolution both associated with a module FOV region on the planar working surface, and wherein each module in the plurality including a receiving optical train and a camera device optically coupled with the receiving optical train, the receiving optical train configured to couple light signals received from the module FOV region on the planar working surface to the camera device, and wherein a plurality of module FOV regions on the planar working surface, respectively associated with the plurality of modules, collectively forming a working FOV and a working captured image resolution both associated with a working FOV region on the planar working surface for a machine vision system;

capturing by the camera device of each module in the plurality a respective module-captured image of a module FOV region on the planar working surface;

adjusting the module-captured image of at least one module in the plurality, wherein the adjusting includes adjusting a module-captured image resolution; and stitching together a plurality of module-captured images of adjacent modules in the plurality; and forming, based on the plurality of module-captured images stitched together, the working FOV region associated with the working captured image resolution for the machine vision system, wherein the working FOV region is larger than each module FOV region and the working captured image resolution is at least equal to or greater than each module-captured image resolution respectively associated with each module FOV region, and wherein at least one optical-image-capture module in the plurality comprises:

a receiving optical train including a high-resolution machine vision macro lens comprising a magnification 0.25× to 1.75× macro lens; and a camera device, optically coupled to the receiving optical train, including high pixel count large format optical image sensors comprising up to 2" format 20 mega-pixel to 65 mega-pixel image sensors with a pixel pitch value in a range of from 2 to 4 microns, for capturing light signals coupled into the camera device by the receiving optical train.

20. A method for operating a machine vision system suitable for use with a microassembler system for inspection of assembly of micro-objects on a planar working surface, the method comprising:

providing a plurality of optical-image-capture modules (optical modules) arranged over, or under, a planar working surface, wherein each module having a module field-of-view (FOV) and a module captured-image resolution both associated with a module FOV region on the planar working surface, and wherein each module in the plurality including a receiving optical train and a camera device optically coupled with the receiving optical train, the receiving optical train configured to couple light signals received from the module FOV region on the planar working surface to the camera device, and wherein a plurality of module FOV regions on the planar working surface, respectively associated with the plurality of modules, collectively forming a working FOV and a working captured image resolution both associated with a working FOV region on the planar working surface for a machine vision system;

capturing by the camera device of each module in the plurality a respective module-captured image of a module FOV region on the planar working surface;

adjusting the module-captured image of at least one module in the plurality, wherein the adjusting includes adjusting a module-captured image resolution; and stitching together a plurality of module-captured images of adjacent modules in the plurality; and forming, based on the plurality of module-captured images stitched together, the working FOV region associated with the working captured image resolution for the machine vision system, wherein the working FOV region is larger than each module FOV region and the working captured image resolution is at least equal to or greater than each module-captured image resolution respectively associated with each module FOV region, wherein at least one optical-image-capture module in the plurality comprises:

a receiving optical train including a telecentric high-resolution machine vision macro lens comprising a magnification 0.25× to 1.75× macro lens.

* * * * *